(12) United States Patent
Levy et al.

(10) Patent No.: US 10,572,855 B1
(45) Date of Patent: Feb. 25, 2020

(54) TRACKING AND AUTHENTICATION OF INVENTORY VIA DISTRIBUTED LEDGERS AND NFC TAGS

(71) Applicant: Digiprint IP LLC, Longboat Key, FL (US)

(72) Inventors: Avery Levy, Longboat Key, FL (US); John Cronin, Bonita Springs, FL (US)

(73) Assignee: DIGIPRINT IP LLC, Longboat Key, FL (US)

( * ) Notice: Subject to any disclaimer, the term of this patent is extended or adjusted under 35 U.S.C. 154(b) by 0 days.

(21) Appl. No.: 16/115,371

(22) Filed: Aug. 28, 2018

(51) Int. Cl.
*G06Q 10/00* (2012.01)
*G06Q 10/08* (2012.01)
*G06K 19/07* (2006.01)

(52) U.S. Cl.
CPC ....... *G06Q 10/087* (2013.01); *G06K 19/0723* (2013.01)

(58) Field of Classification Search
CPC .................. G06K 7/10297; G06K 7/10722
USPC ................................. 235/380, 385
See application file for complete search history.

(56) References Cited

U.S. PATENT DOCUMENTS

| | | | |
|---|---|---|---|
| 9,610,476 B1 | 4/2017 | Tran et al. | |
| 9,717,958 B1 | 8/2017 | Tran et al. | |
| 9,849,364 B2 | 12/2017 | Tran et al. | |
| 9,975,033 B2 | 5/2018 | Tran et al. | |
| 10,022,613 B2 | 7/2018 | Tran et al. | |
| 10,022,614 B1 | 7/2018 | Tran et al. | |
| 10,046,228 B2 | 8/2018 | Tran et al. | |
| 2017/0232300 A1 | 8/2017 | Tran et al. | |
| 2018/0078843 A1 | 3/2018 | Tran et al. | |
| 2018/0117446 A1 | 5/2018 | Tran et al. | |
| 2018/0117447 A1 | 5/2018 | Tran et al. | |
| 2018/0133583 A1 | 5/2018 | Tran et al. | |
| 2018/0144292 A1 | 5/2018 | Mattingly et al. | |
| 2018/0174097 A1* | 6/2018 | Liu | G06Q 10/0833 |
| 2018/0189528 A1* | 7/2018 | Hanis | G06Q 30/0185 |
| 2018/0232693 A1 | 8/2018 | Gillen et al. | |
| 2018/0264347 A1 | 9/2018 | Tran et al. | |
| 2019/0019144 A1 | 1/2019 | Gillen | |
| 2019/0057454 A1 | 2/2019 | Komenda et al. | |

OTHER PUBLICATIONS

U.S. Appl. No. 16/115,339 Office Action dated Nov. 8, 2018.
U.S. Appl. No. 16/115,339 Office Action dated May 2, 2019.

* cited by examiner

*Primary Examiner* — Rokib Masud
(74) *Attorney, Agent, or Firm* — Polsinelli LLP

(57) ABSTRACT

Copies of a distributed ledger with multiple blocks are stored on multiple computing devices. A first computing device coming into proximity with a particular object triggers generation of a new block to the distributed ledger, the new block identifying changes to an inventory of objects of the object type and including a hash of a previous block of the distributed ledger. The new block is optionally verified before it is appended onto the distributed ledger and transmitted out to each of the multiple computing devices so that each copy of the distributed ledger includes the new block.

27 Claims, 29 Drawing Sheets

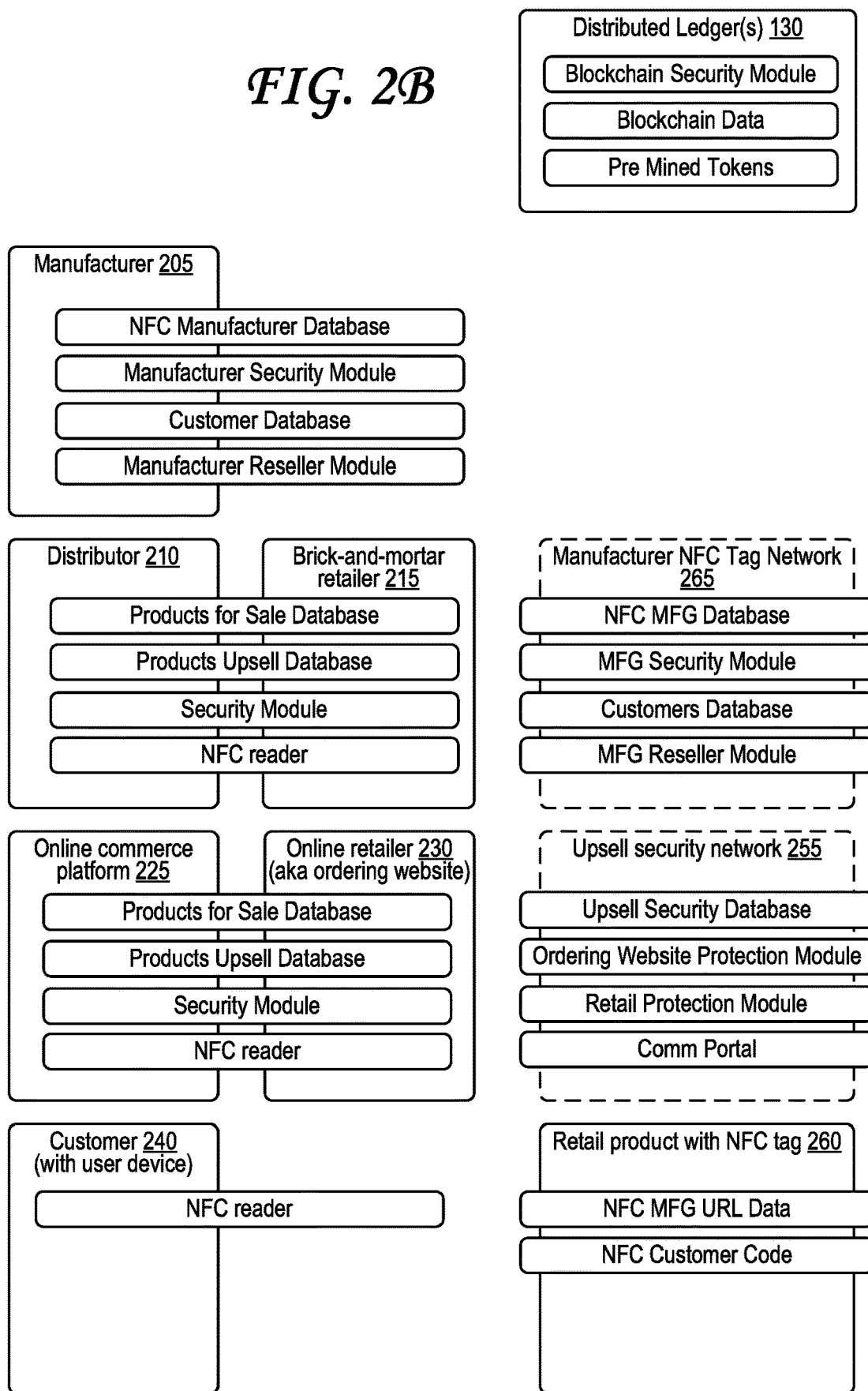

FIG. 7B

Generating a new block to add to the blockchain can be made to be difficult if "miner" devices/nodes are to be rewarded. A predetermined difficulty target value may be used. To successfully generate a new block, a hash of the new block must be numerically less than the difficulty target value for the new block to be successful. Each "miner" device/node can try hashing different versions of the new block, each with different nonce values and thereby producing different hashes, until one of these versions of the new block has a hash that is less than the difficulty target value. 745

Difficulty target value stays constant for the duration of a predetermined time period (e.g., 2 weeks). Before the next time period starts, the difficulty target value can be adjusted using formula:

750

$$\begin{pmatrix} \text{Adj.} \\ \text{diff.} \\ \text{target} \end{pmatrix} = \begin{pmatrix} \text{Prev.} \\ \text{diff.} \\ \text{target} \end{pmatrix} \times \begin{pmatrix} \dfrac{\text{Pred. time period}}{\text{Total transaction time for N trans. during pred. time period}} \end{pmatrix}$$

755

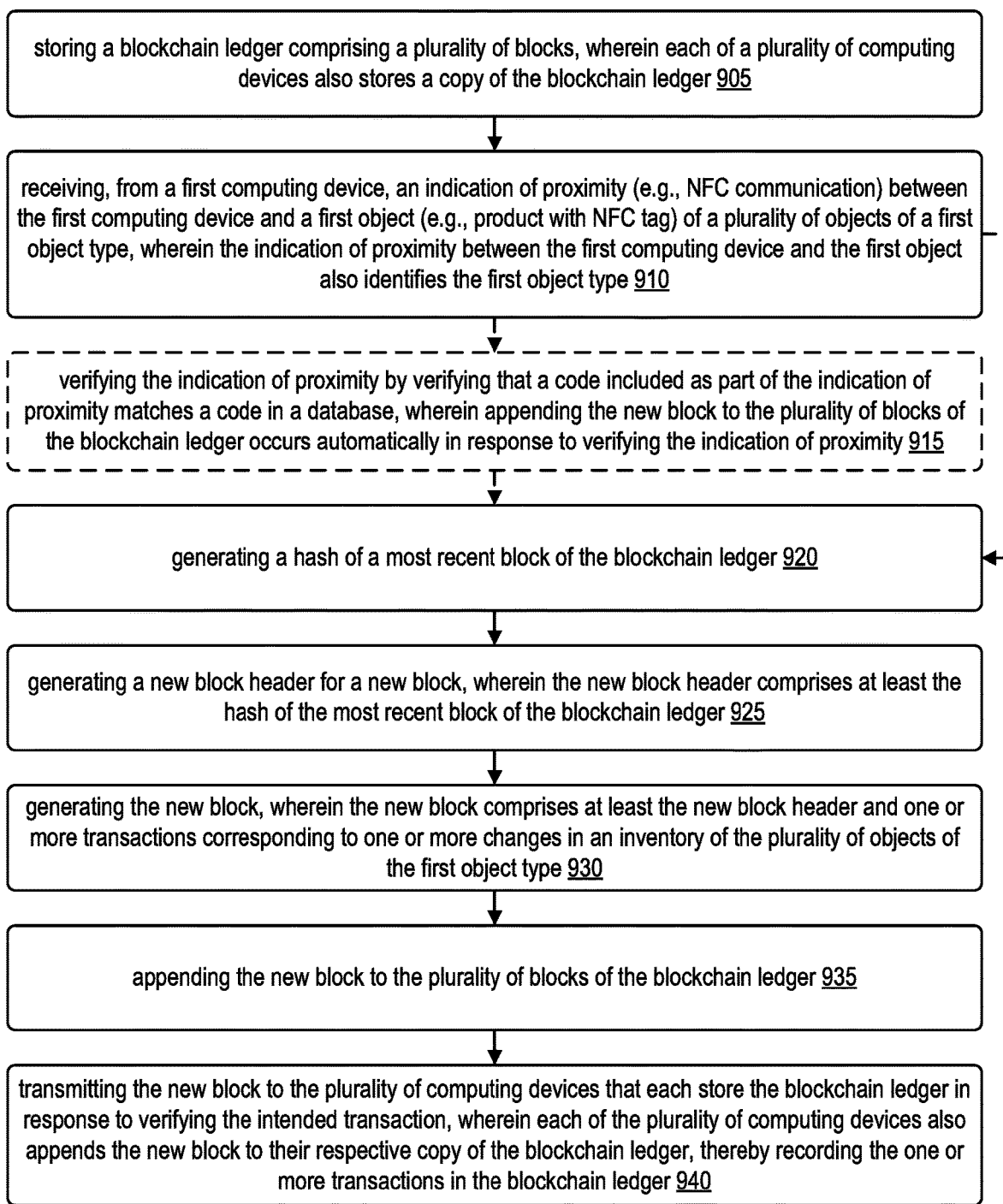

FIG. 10A

| Customer | | | | | Purchase | | | Purchased Upsell Products | | |
|---|---|---|---|---|---|---|---|---|---|---|
| Customer ID | Name | Address | E-mail | | Account # | Price | | Upsell 1 SKU | Upsell 2 SKU | Upsell N SKU |
| TS123 | Tom Smith | 123 Main Street | TS1@gmail | | #4583 | $129.99 | | #5647 | #3687 | #7891 |
| MT456 | Mike Thomas | 25 Elm Street | MikeT@gmail | | #9865 | $205.14 | | #8974 | #4598 | #6543 |
| EJ989 | Eric Johnson | 45 Maple Drive | Ejohn@gmail | | #7521 | $75.56 | | #5623 | #8523 | #1245 |
| - | - | - | - | | - | - | | - | - | - |
| - | - | - | - | | - | - | | - | - | - |
| - | - | - | - | | - | - | | - | - | - |

*FIG. 10B*

| Keys | | | | | Customer | | | | Purchased Upsell Products | | | Purchase | |
|---|---|---|---|---|---|---|---|---|---|---|---|---|---|
| private key | public key | Ordered Product SKU | Reseller | NFC Code | Customer ID | Name | Address | E-mail | Upsell 1 SKU | Upsell 2 SKU | Upsell N SKU | Account # | Price |
| XXXXXX | LLB001 | #1234 | N/A | URL 1 | TS123 | Tom Smith | 123 Main Street | TS1@gmail | #5647 | #3687 | #7891 | #4583 | $129.99 |
| XXXXXX | LLB002 | #4567 | Reseller URL | URL 2 | MT456 | Mike Thomas | 25 Elm Street | MikeT@gmail | #8974 | #4598 | #6543 | #9865 | $205.14 |
| XXXXXX | LLB003 | #7899 | N/A | URL N | EJ989 | Eric Johnson | 45 Maple Drive | Ejohn@gmail | #5623 | #8523 | #1245 | #7521 | $75.56 |
| - | - | - | - | - | - | - | - | - | - | - | - | - | - |
| - | - | - | - | - | - | - | - | - | - | - | - | - | - |

FIG. 12

| Product SKU | Upsell 1 SKU | Upsell 2 SKU | Upsell N SKU | Location 1 | Location 2 | Location N | Coupon 1 | Coupon N |
|---|---|---|---|---|---|---|---|---|
| #1234567 | #9876451 | #6541237 | #7891235 | South Burlington, VT | Burlington, VT | Colchester, VT | $10 Off | 10% Off |
| #1122334 | #5546982 | #8899512 | #8449562 | Essex, VT | Burlington, VT | South Burlington, VT | 10% Off | 15% Off |
| #4998874 | #4568213 | #6548823 | #7854218 | Burlington, VT | Williston, VT | South Burlington, VT | Free Shipping | $5 Off |
| - | - | - | - | - | - | - | - | - |
| - | - | - | - | - | - | - | - | - |

FIG. 14

| Keys | | | Product | | | | Purchase | | | | | |
|---|---|---|---|---|---|---|---|---|---|---|---|---|
| private key | public key | NFC Code | Product SKU | Upsell 1 SKU | Upsell 2 SKU | Upsell N SKU | Account # | Price | Reseller | Location 1 | Location N | Customer ID |
| XXXXXX | LLB001 | URL 1 | #1234 | #5647 | #1425 | #8523 | #4583 | $129.99 | N/A | South Burlington, VT | Burlington, VT | TS123 |
| XXXXXX | LLB002 | URL 2 | #4567 | #8974 | #6958 | #1595 | #9865 | $205.14 | Reseller URL | Essex, VT | Burlington, VT | MT456 |
| XXXXXX | LLB003 | URL N | #7899 | #5623 | #7485 | #5735 | #7521 | $75.56 | N/A | Burlington, VT | Williston, VT | EJ989 |
| . | . | . | . | . | . | . | . | . | . | . | . | . |
| . | . | . | . | . | . | . | . | . | . | . | . | . |
| . | . | . | . | . | . | . | . | . | . | . | . | . |

Customer Information Data

| Customer | | | | Purchased Upsell Products | | | Coupon | |
|---|---|---|---|---|---|---|---|---|
| Customer ID | Name | Address | E-mail | Upsell 1 SKU | Upsell 2 SKU | Upsell N SKU | Coupon 1 | Coupon N |
| TS123 | Tom Smith | 123 Main Street | TS1@gmail | #5647 | #3687 | #7891 | $10 Off | 10% Off |
| MT456 | Mike Thomas | 25 Elm Street | MikeT@gmail | #8974 | #4598 | #6543 | 10% Off | 15% Off |
| EJ989 | Eric Johnson | 45 Maple Drive | Ejohn@gmail | #5623 | #8523 | #1245 | Free Shipping | $5 Off |
| . | . | . | . | . | . | . | . | . |
| . | . | . | . | . | . | . | . | . |
| . | . | . | . | . | . | . | . | . |

FIG. 16

| Keys | | | Product | | | | | Customer Information Data | | | | Purchased Upsell Products | | | Coupon | |
|---|---|---|---|---|---|---|---|---|---|---|---|---|---|---|---|---|
| | | | | | | | | Customer | | | | | | | | |
| private key | public key | NFC Code | Product SKU | Upsell 1 SKU | Upsell 2 SKU | Upsell N SKU | | Customer ID | Name | Address | E-mail | Upsell 1 SKU | Upsell 2 SKU | Upsell N SKU | Coupon 1 | Coupon N |
| XXXXXX | LLB001 | URL 1 | #1234 | #5647 | #1425 | #8523 | | TS123 | Tom Smith | 123 Main Street | TS1@gmail | #5647 | #3687 | #7891 | $10 Off | 10% Off |
| XXXXXX | LLB002 | URL 2 | #4567 | #8974 | #6958 | #1595 | | MT456 | Mike Thomas | 25 Elm Street | MikeT@gmail | #8974 | #4598 | #6543 | 10% Off | 15% Off |
| XXXXXX | LLB003 | URL N | #7899 | #5623 | #7485 | #5735 | | EJ989 | Eric Johnson | 45 Maple Drive | Ejohn@gmail | #5623 | #8523 | #1245 | Free Shipping | $5 Off |
| . | . | . | . | . | . | . | | . | . | . | . | . | . | . | . | . |
| . | . | . | . | . | . | . | | . | . | . | . | . | . | . | . | . |
| . | . | . | . | . | . | . | | . | . | . | . | . | . | . | . | . |

FIG. 19

| Product SKU | Location 1 | Location 2 | Location N |
|---|---|---|---|
| #1234567 | South Burlington, VT | Burlington, VT | Colchester, VT |
| #1122334 | Essex, VT | Burlington, VT | South Burlington, VT |
| #4998874 | Burlington, VT | Williston, VT | South Burlington, VT |
| - | - | - | - |
| - | - | - | - |
| - | - | - | - |

US 10,572,855 B1

TRACKING AND AUTHENTICATION OF INVENTORY VIA DISTRIBUTED LEDGERS AND NFC TAGS

BACKGROUND

Field of the Invention

The present invention generally relates to transaction and product management. More specifically, the present invention relates to tracking and authentication of products and product transactions via distributed ledgers and NFC tags.

Description of the Related Art

Modern commerce provides many avenues for customers to purchase products. Products traditionally purchased by customers at brick-and-mortar stores can now be purchased over the internet from online retailers or large online commerce platforms. In some cases, customers are able purchase products directly from high-level distributors or even directly from manufacturers, which can provide cost savings for customers by cutting out "middleman" entities.

Along with these benefits to customers also come growing risks. The expansion of legitimate commerce brought about by the internet has also increased illegitimate commerce, such as an increased risk to customers of unknowingly buying counterfeit goods. Customers purchasing from online sources often cannot see, touch, or otherwise try the actual product they will receive until it is finally delivered, potentially a long time after the purchase. A customer who receives a product that is broken, non-functional, ill-fitted, counterfeit, or simply not what the customer expected can have a difficult time returning the product, getting a refund, or getting a replacement. Customers typically also have no way to know for sure that their product is genuine.

Digital currencies (or "cryptocurrencies") such as Bitcoin are based on a distributed peer-to-peer network of devices maintaining a distributed ledgers, such as blockchain ledgers, of all transactions made using the digital currency. Distributed blockchain ledgers offer improved security between parties compared to traditional centralized systems in that blockchain ledgers are safe from outages due to their distributed nature and are nearly immutable. So far, use of blockchain ledger technologies have largely remained confined to use with digital currencies such as Bitcoin.

Near-field communication (NFC) is a short-range wireless communication technology enabling one-way or two-way wireless communications between two electronic devices. Often, one or both of these electronic devices is a portable computing device, such as a smartphone. NFC "tags" are passive data stores which can be read, and under some circumstances written to, by an NFC device. NFC tags typically do not require a battery—the wireless signals that the NFC tag receives from an "active" powered NFC device such as a smartphone generally supply enough power to the NFC tag to allow the NFC tag to emit a detectable response to the active NFC device, the response generally conveying data that is stored on the NFC tag.

Accordingly, a more secure, reliable, and distributed technology for tracking and authentication of products and product transactions is needed.

SUMMARY OF THE PRESENTLY CLAIMED INVENTION

A method of tracking of an inventory via a distributed architecture that includes a plurality of computing devices is described. The method includes storing a distributed ledger comprising a plurality of blocks, wherein each of the plurality of computing devices also stores a copy of the distributed ledger. The method also includes receiving, from a first computing device, an indication of proximity between the first computing device and a first object of a plurality of objects of a first object type, wherein the indication of proximity between the first computing device and the first object identifies the first object type. The method also includes generating a hash of a most recent block of the plurality of blocks and generating a new block header for a new block, wherein the new block header comprises at least the hash of the most recent block. The method also includes generating the new block comprising at least the new block header and one or more transactions corresponding to one or more changes in an inventory of the plurality of objects of the first object type. The method also includes appending the new block to the plurality of blocks of the distributed ledger. The method also includes transmitting the new block to the plurality of computing devices that each store the distributed ledger, causing each of the plurality of computing devices to also append the new block to their respective copy of the distributed ledger, thereby recording the one or more transactions in the distributed ledger.

A system for tracking of an inventory via a distributed architecture that includes a plurality of computing devices is described. The system includes a non-transitory computer-readable storage medium that stores a distributed ledger including a plurality of blocks, wherein each of the plurality of computing devices also stores a copy of the distributed ledger. The system also includes a network communication transceiver that receives an indication of proximity between a first computing device and a first object of a plurality of objects of a first object type, and that transmits a new block to the plurality of computing devices, wherein the indication of proximity between the first computing device and the object identifies the first object type. The system also includes one or more processors executing instructions that are stored in a memory, wherein execution of the instructions via the one or more processors causes the one or more processors to perform system operations. The system operations include generating a hash of a most recent block of the distributed ledger and generating a new block header for the new block, wherein the new block header comprises at least the hash of the most recent block of the distributed ledger. The system operations also include generating the new block, wherein the new block comprises at least the new block header and one or more transactions corresponding to one or more changes in an inventory of the plurality of objects of the first object type. The system operations also include appending the new block to the plurality of blocks of the distributed ledger.

A method of tracking of an inventory via a distributed architecture that includes a plurality of computing devices is described. The method includes storing a distributed ledger comprising a plurality of blocks, wherein each of the plurality of computing devices also stores a copy of the distributed ledger. The method also includes receiving, at a first computing device, an indication of proximity between the first computing device and a first object of a plurality of objects of a first object type. The method also includes transmitting a request to add a new block to the distributed ledger to at least one of the plurality of computing devices, the new block identifying one or more changes in an inventory of the plurality of objects of the first object type.

The method also includes receiving the new block and appending the new block to the plurality of blocks of the distributed ledger.

BRIEF DESCRIPTION OF THE DRAWINGS

FIG. 2B illustrates elements optionally included among the devices in the distributed architecture of FIG. 2A.

FIG. 9 is a flow diagram illustrating operations for proximity-based itinerary tracking via distributed ledger.

FIG. 10A illustrates a database for tracking transactions made by customers of an online retailer, also tracking addresses and related products ("upsell" products).

FIG. 10B illustrates an expanded version of the database of FIG. 10A that tracks additional information such as security keys and resellers.

FIG. 12 illustrates a database for tracking products that are related to a particular product ("upsell" products) at different locations as well as relevant coupons.

FIG. 14 illustrates an online retailer security and upsell database tracking purchases, related product groups ("upsell" products), security keys, customer information, coupon data, and other information.

FIG. 16 illustrates an online retailer upsell database tracking customers, related product groups ("upsell" products), coupons, and security keys.

FIG. 19 illustrates a database of store locations at which particular products are stocked.

DETAILED DESCRIPTION

Copies of a distributed ledger with multiple blocks are stored on multiple computing devices. A first computing device coming into proximity with a particular object triggers generation of a new block to the distributed ledger, the new block identifying changes to an inventory of objects of the object type and including a hash of a previous block of the distributed ledger. The new block is optionally verified before it is appended onto the distributed ledger and transmitted out to each of the multiple computing devices so that each copy of the distributed ledger includes the new block.

Figure 1A:
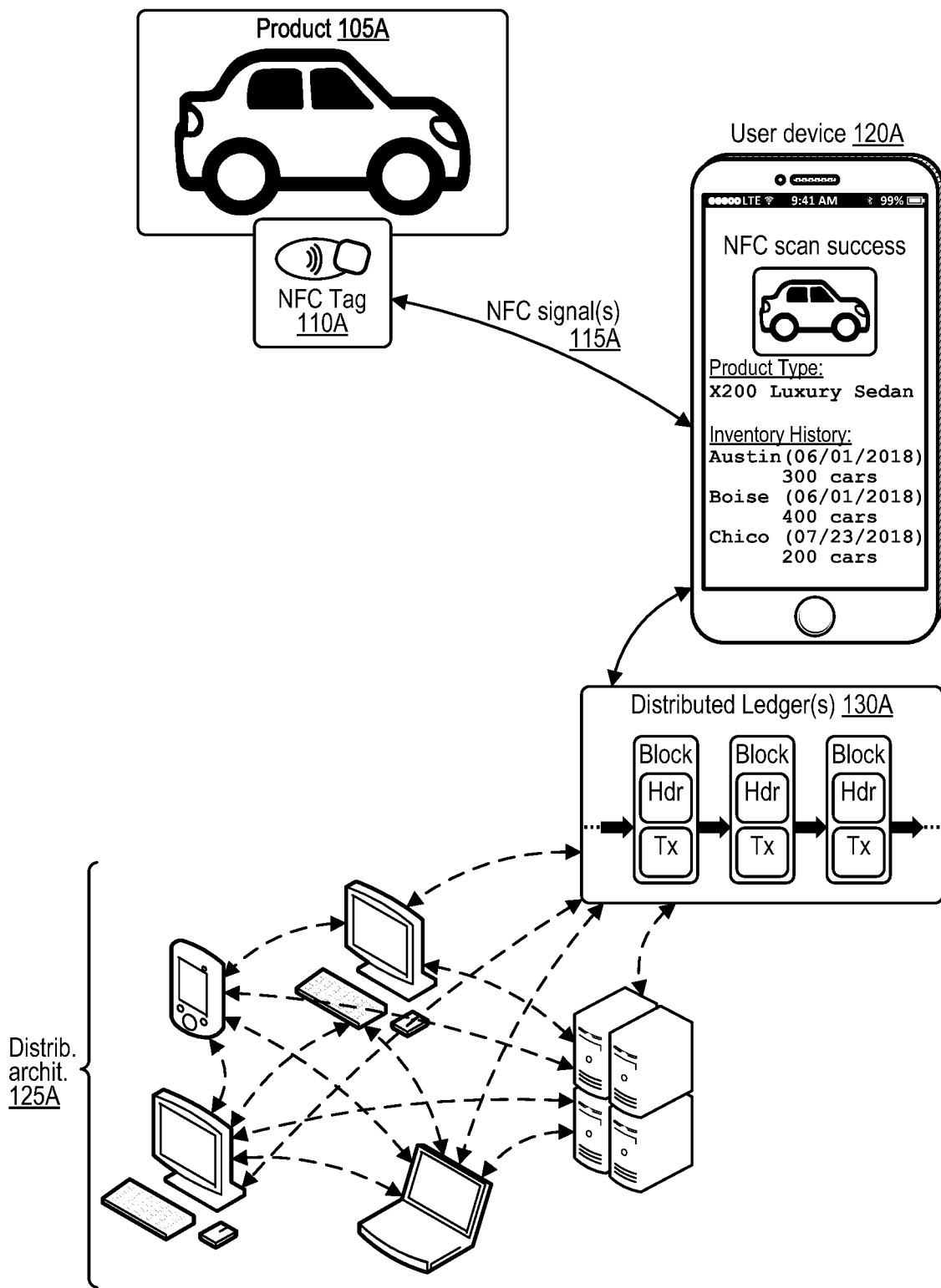
FIG. 1A illustrates retrieval of inventory amounts of a product type at different locations as accessed from a distributed ledger using an NFC tag associated with a single product of the product type.

FIG. 1A illustrates retrieval of inventory amounts of a product type at different locations as accessed from a distributed ledger using an NFC tag associated with a single product of the product type.

In particular, a product/object 105A—which in FIG. 1A appears as an automobile vehicle 110A of product type/object type "x200 Luxury Sedan"—includes an NFC tag 110A. The NFC tag 110A may be, for example, embedded in a portion of the vehicle 105A, such as along the dashboard, or on an exterior or interior surface of a door.

The user device 120A, which in most cases is a computing device 800, communicates with the NFC tag 110A via one or more short-range wireless signals 115A. The user device 120A may provide electrical power wirelessly to the NFC tag 110A, in response to which the NFC tag 110A conveys data/information to the user device 120A via NFC signals 115A. For example, the NFC tag 110A can provide the user device 120A with a code that the user device 120A would otherwise not know. The code may be a unique identifier corresponding to that particular NFC tag 110A. The NFC tag 110A can alternately or additionally provide the user device 120A with an address or other information identifying or pointing to a particular distributed ledger 130A in a way that makes the particular distributed ledger 130A accessible.

While the code may store information about characteristics of the object and/or of the object type of the object, memory of NFC tags may sometimes be hardcoded and immutable or difficult to change. Thus, information that may change over time, such as ownership or location of the vehicle 105A, is better stored externally from the NFC tag 110A, such as via the distributed ledger 130A. The user device 120A can use the address or identifier identifying the distributed ledger 130A provided by the NFC tag 110A to access the distributed ledger 130A, copies of which are stored at each device of a distributed architecture 125A having multiple computing devices 800. As illustrated in FIG. 1A, the information identifying the product 105A as being a product of a "x200 Luxury Sedan" product type is conveyed to the user device 120A either encoded directly in the wireless signals 115A, in the distributed ledger 130A, or both. The distributed ledger 130A stores information keeping track of inventories of the products 105A of the product type at various provider locations associated with providers such as retailers, distributors, manufacturers, shippers, and the like. The provider inventory of FIG. 1A indicates that as of Jun. 1, 2018, a provider location in Austin, Tex. has 300 cars of the "x200 Luxury Sedan" product type; as of Jun. 1, 2018, a provider location in Boise, Id. has 400 cars of the "x200 Luxury Sedan" product type; and as Jul. 23, 2018, a provider location in Chico, Calif. has 200 cars of the "x200 Luxury Sedan" product type. The user device 110A reads and parses this provider inventory information from the distributed ledger(s) 130A, then displays this provider inventory information.

The code may also include one or more resources pointing to one or more websites and/or databases associated with one or more providers such as one or more of a retailer (online or brick-and-mortar), a manufacturer, a distributor, a shipping provider, any other type of provider discussed herein, or some combination thereof. In some cases, information in the code may be encrypted using a public key or a private key of a keypair that includes a public key and a private key, where the other key of the keypair is in the possession of at least one of the one or more providers discussed above. The code conveyed by the NFC tag 110 may in some cases include such a public key or private key. These processes are discussed further with respect to FIGS. 9-19.

The distributed ledger may be a public distributed ledger or a private distributed ledger, sometimes referred to as a "permissioned" distributed ledger. Public distributed ledgers provide the benefit of unbiased verification by anyone with access to the ledger (and in general by a greater population), but have the risk of making public data that should remain secret or otherwise not be public. Private or privileged distributed ledgers reduce the risk of making public data that should remain secret or otherwise not be public, as they are only accessible to computers through one or more "gateway" servers (which are computing devices 800) controlling access to the distributed ledger by requiring that computing devices 800 requesting access to the distributed ledger be authenticated (e.g. via a signature encrypted with a user's private key that is verified by a certificate authority with the corresponding public key) as having permission to access it. Private or privileged distributed ledgers can thus limit access to certain data (e.g., from competitors or malicious parties), but reduce the pool of verifying machines and thereby increase the risk of bias in blockchain verification procedures, and also introduce "trusted" middleman parties or servers such as the certificate authority that reduce the degree of decentralization introduce potential points of failure. To get the best of both worlds, there may effectively be a public "portion" and a private "portion" of a distributed ledger, which may actually in execution be a separate public distributed ledger and a separate private/permissioned distributed ledger. In a private or privileged distributed ledger, authentication by the gateway server and via the signature/certificate authority may be required to acquire permission to read or access one or more blocks of the distributed ledger, to acquire permission to request a transaction be added to the ledger, to acquire permission to request a new block be added to the ledger, to acquire permission to verify a transaction or a new block, to acquire permission to finalize the appending of a new block (and transmit the new block and/or updated ledger to the distributed architecture 125), or some combination thereof. Whether a distributed ledger as used herein is public or private, storage of data in the distributed ledger provides protection from outages or data corruption in that data associated with a particular provider is stored on additional devices, and diversifies how important data within the provider's organization is stored.

Figure 1B:
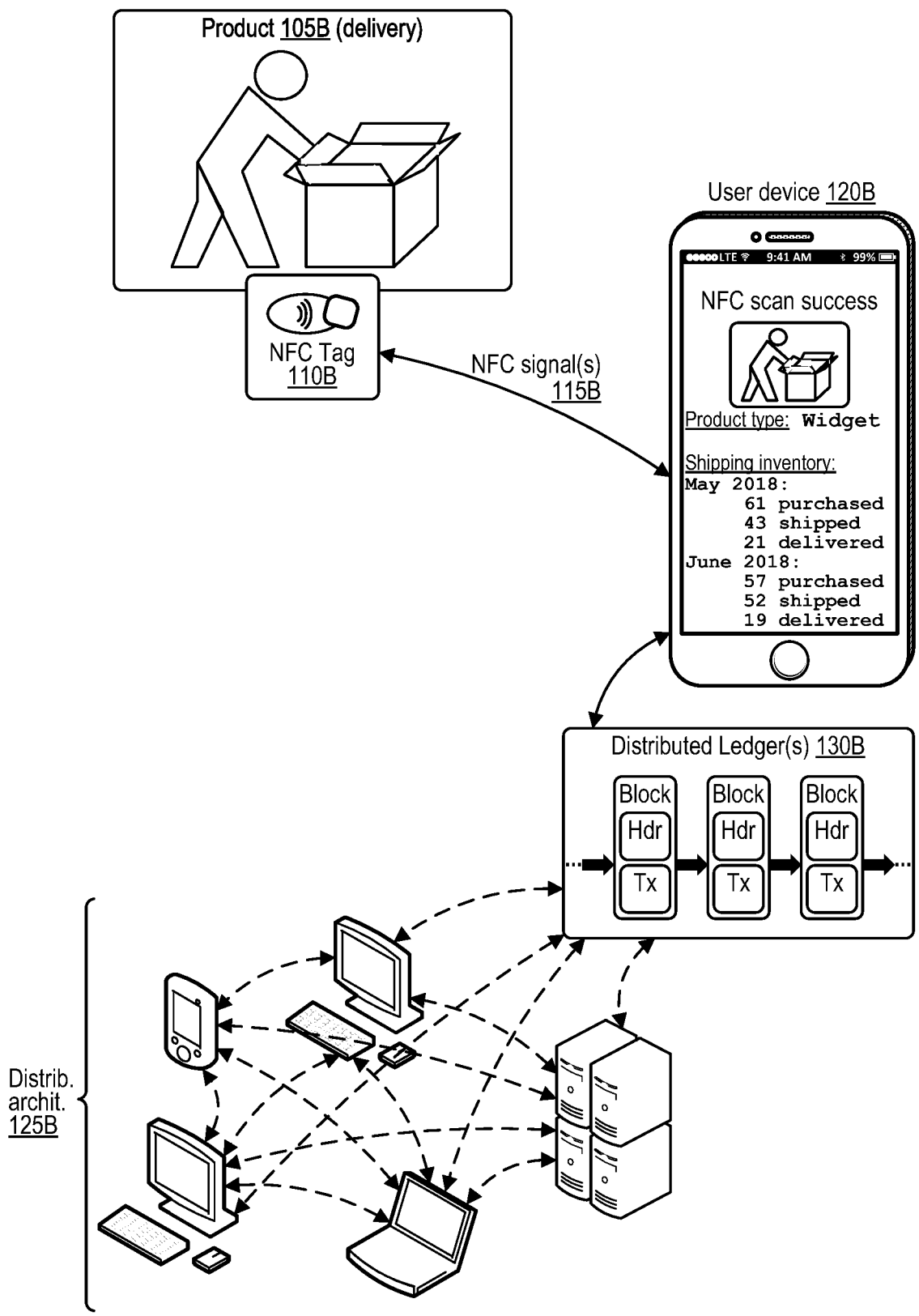
FIG. 1B illustrates retrieval of a shipping inventory of a product type as accessed from a distributed ledger using an NFC tag associated with a single product of the product type.
Figure 1C:
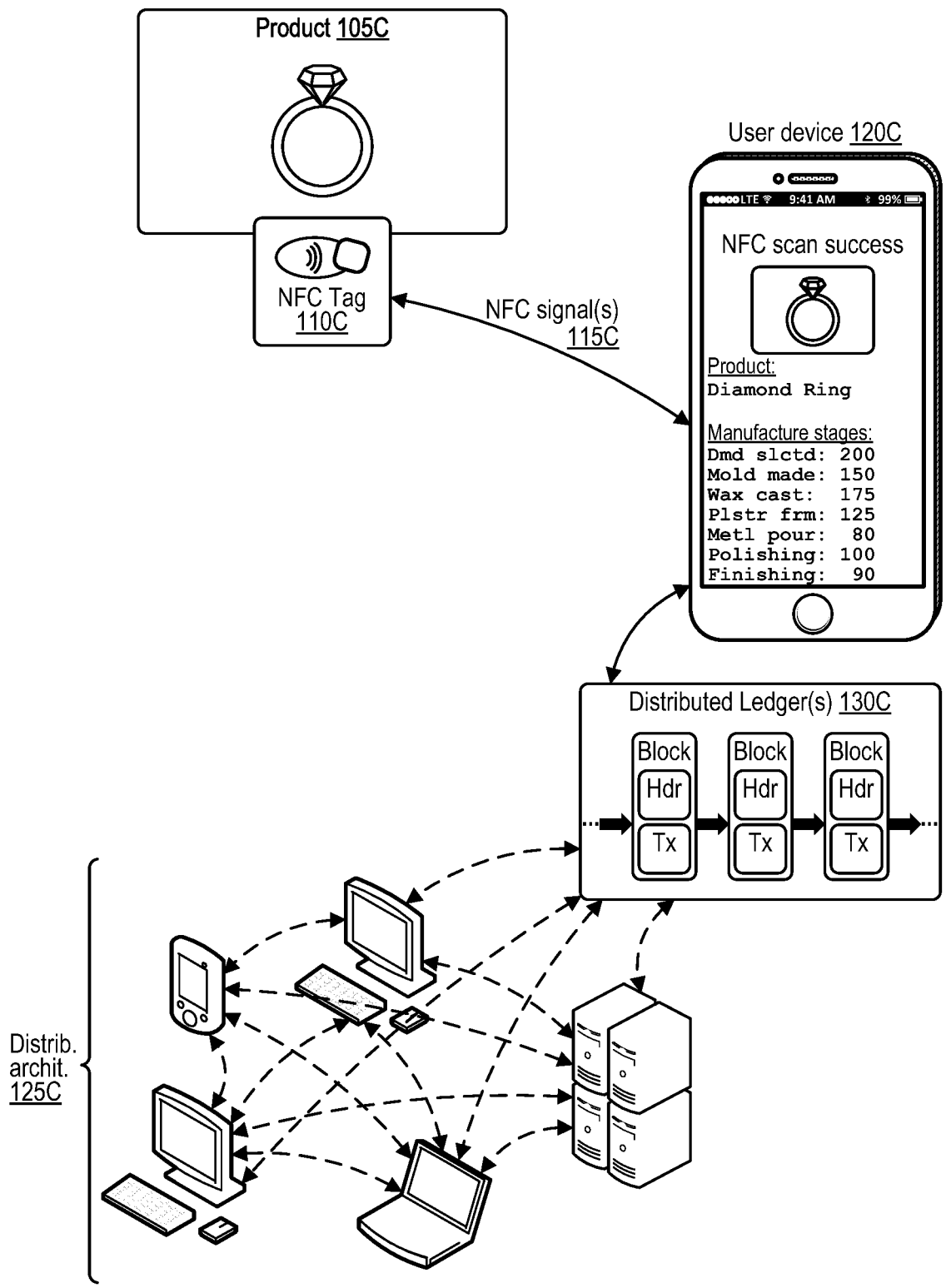
FIG. 1C illustrates retrieval of a manufacturing inventory of a product type as accessed from a distributed ledger using an NFC tag associated with a single product of the product type.
Figure 1D:
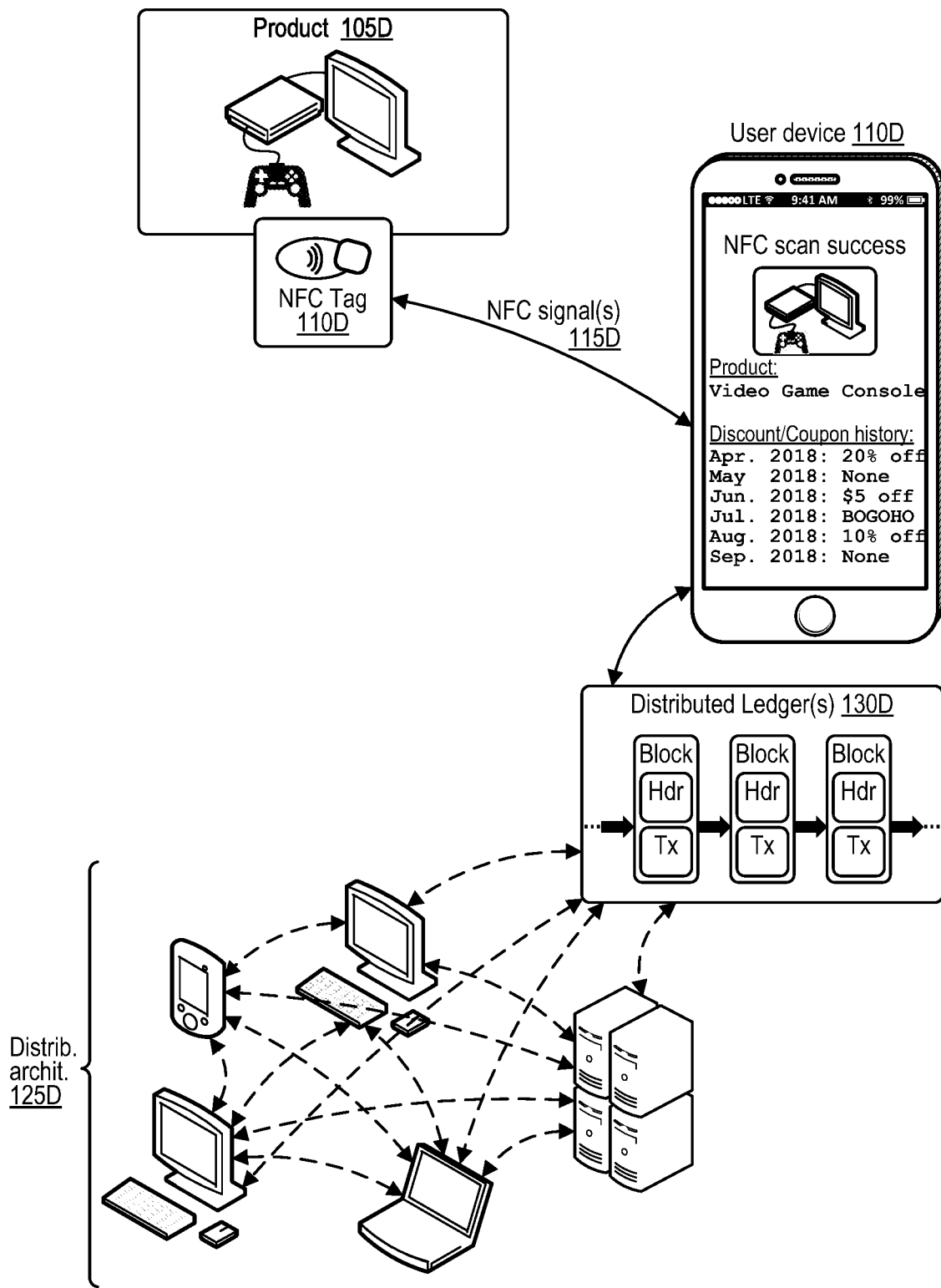
FIG. 1D illustrates retrieval of a discount history of a product as accessed from a distributed ledger using an NFC tag associated with a single product of the product type.
Figure 1E:
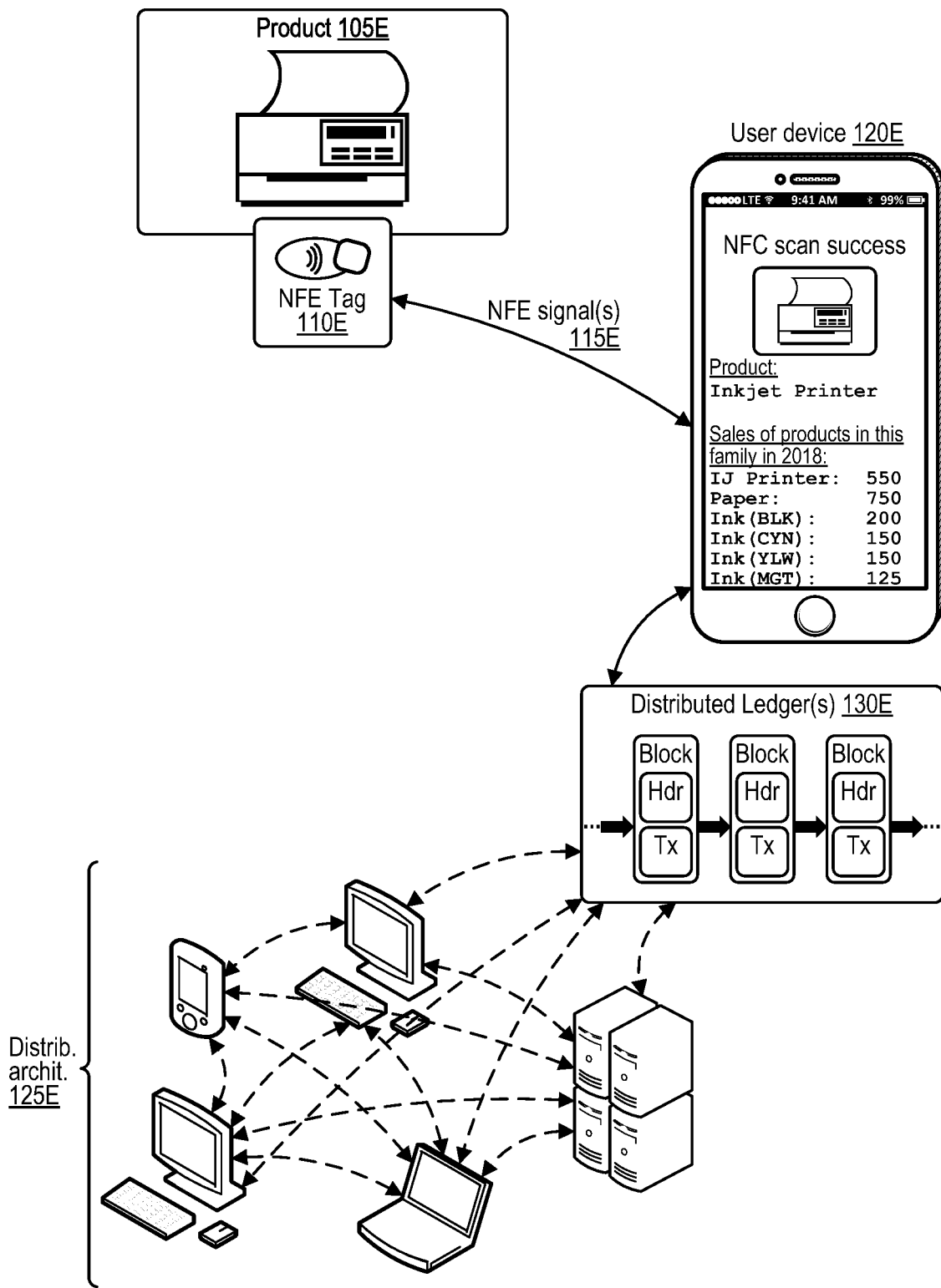
FIG. 1E illustrates retrieval of a sales history of products related to a product type accessed from a distributed ledger using an NFC tag associated with a single product of the product type.

As an example, one or more providers discussed above may wish to keep certain data a trade secret, such as information about which products are related to each other (in other words, are "upsell" products with relation to each other) as in FIG. 1E, or a manufacturing schedule as in FIG. 1C, or a discount/coupon/promotion as in FIG. 1D. Similar data may also be kept private to address consumer privacy concerns, such as the inventory data of FIG. 1A and FIG. 4B (particularly if ownership continues to be tracked to individual users as in FIG. 4B) or location data of FIG. 1G (particularly if it were to track location of objects even purchase by consumers) or shipping history of FIG. 1B (particularly if consumer addresses are stored). Such data would best be placed in a private/permissioned distributed ledger accessible only to computing devices 800 associated with one or more of the providers discussed above. Less sensitive data, such as inventory history of FIG. 1A or FIG. 4B (if it is limited only to retail location inventory) or shipping history of FIG. 1B (if consumer addresses are not stored), may be in a public distributed ledger. It should be understood that the examples provided herein are not to be construed as limiting, and that any of the data described herein as potentially being stored in a distributed ledger 130 may be stored in a public distributed ledger or a private/permissioned distributed ledger.

Figure 4A:
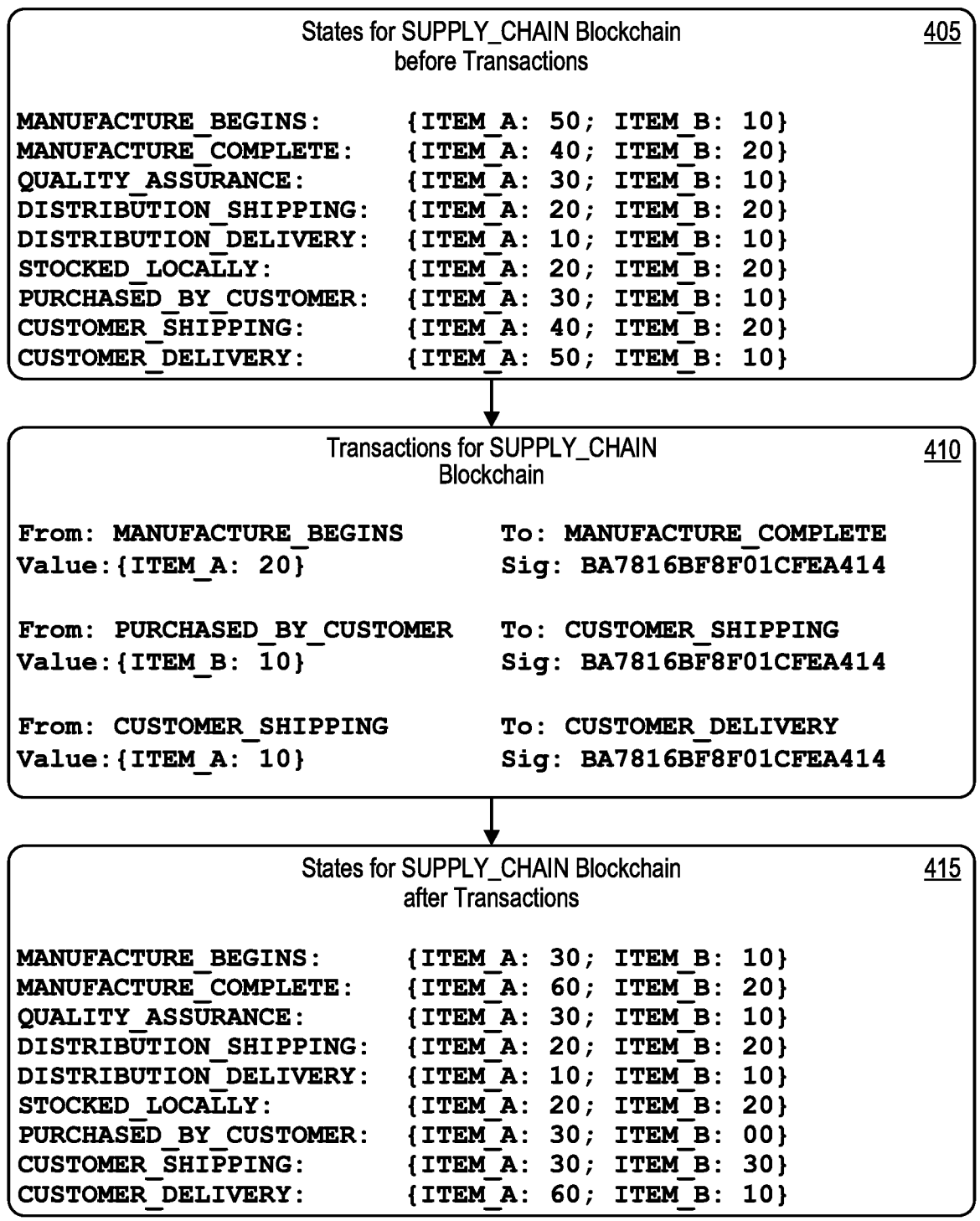
FIG. 4A illustrates transactions related to supply chain stages of items of two item types as recorded via distributed ledger.
Figure 4B:
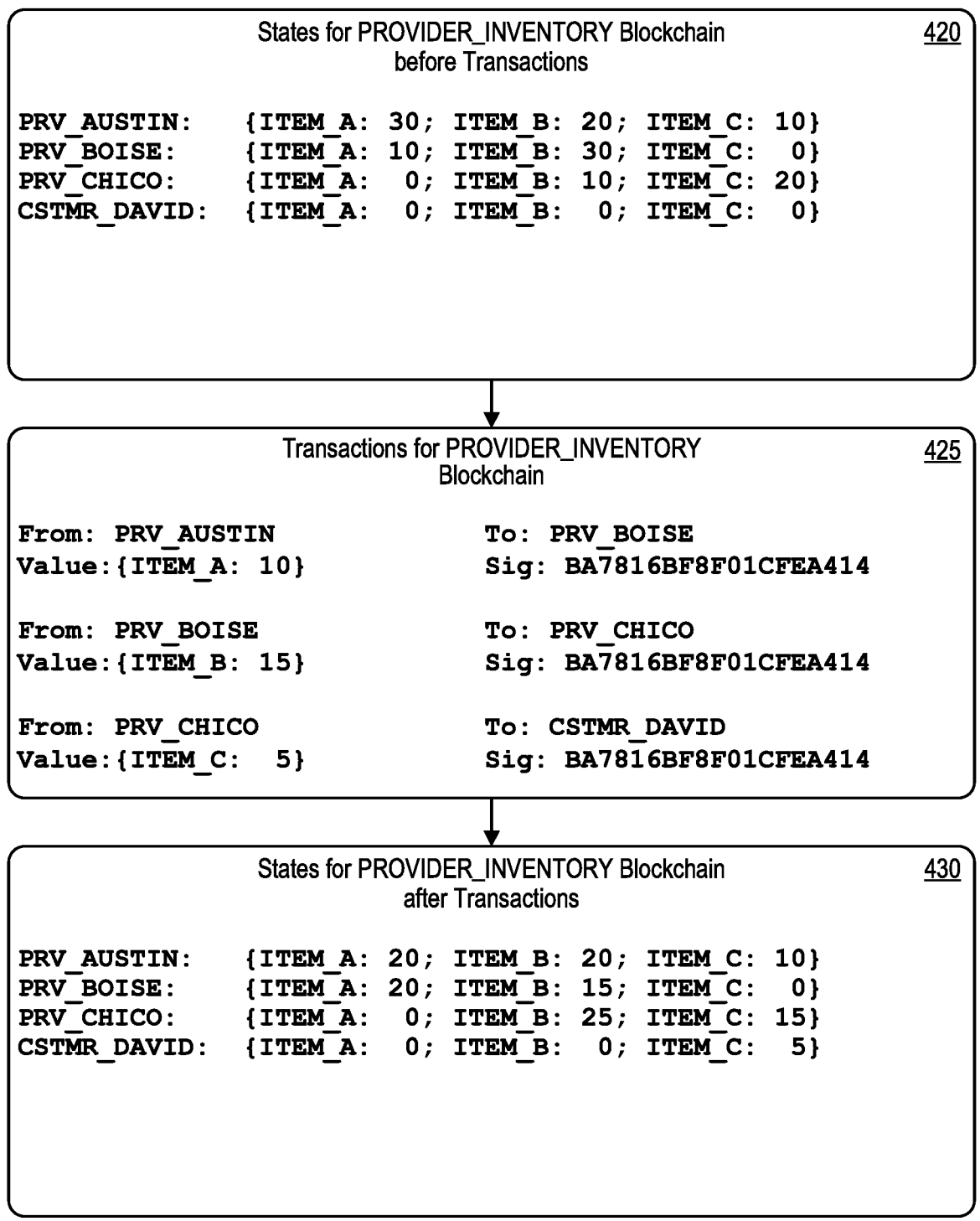
FIG. 4B illustrates transactions related to provider inventories of items of three item types as recorded via distributed ledger.

The user device 120A may add a new block corresponding to a new provider inventory information to the distributed ledger 130A, for example when vehicles of the "x200 Luxury Sedan" product type are transferred between different provider locations or sold to customers as shown/discussed with respect to the transactions of FIG. 4B. To record a transaction the user device 120A may have a public/private key pair, including a private key and a public key, that corresponds to that user device 120A in particular and/or to a particular user or individual that uses the user device 120A (in this example, this could be either a transferor, such as one of the providers, or a transferee, such as another provider or a customer). The user device 120A may encrypt the code received from the NFC tag 110A via the wireless signals 115A using the private key.

The user device 120A can then send this encrypted code to the computing devices 800 of the distributed architecture 125A, which may then verify, using the public key, that the code was encrypted using the corresponding private key, and that this public/private keypair corresponds to an user and/or device that is appropriate to be requesting a transaction between the transferor and the transferee—for instance, by verifying that the public/private keypair corresponds to the transferor or to the transferee. Since the private key is inaccessible to anyone other than these users, nobody can pretend to be them. Each user's public key, on the other hand, is made available to each of the computing devices 800 of the distributed architecture 125A for this verification process, for example via one or more centralized certificate authority (CA) server(s) or a distributed certificate authority (CA) ledger stored on another distributed ledger 130. Verification can also entail checking to make sure that the object 105A that the transferor is attempting to transfer to the transferee is actually possessed by the transferor at the moment the transaction was attempted, and that no concurrent conflicting transaction was also pending, such as transferor simultaneously attempting to transfer the vehicle 105A to another transferee.

It should be understood that each of the transactions of the distributed ledger 130A were added in this way. That is, a user device 120 corresponding to a transferee or transferor inserted the transaction from the transferee to the transferor into the distributed ledger 130A.

In the case where the product 105 is a vehicle 105A as in FIG. 1A, or where the product 105 is another structure with doors like a building (not pictured), the NFC tag 110A may be reachable from the exterior of the product 105 and may be electrically connected to circuitry of the product 105 in a way that makes it necessary to interact with the NFC tag 110A for a new user to open doors the product 105, and can even in some cases make it necessary for a user device 120A to provide confirmation to the NFC tag 110A (especially when the NFC tag 110A is an active NFC device) that it is the user device 120A of the current owner of the product 105 as identified in the distributed ledger 130A. This can be done by the user device 120A encrypting data, such as the code from the NFC tag 110A, using its private key, and sending the encrypted data to the NFC tag 110A to decrypt using the public key to confirm identity.

Figure 3:
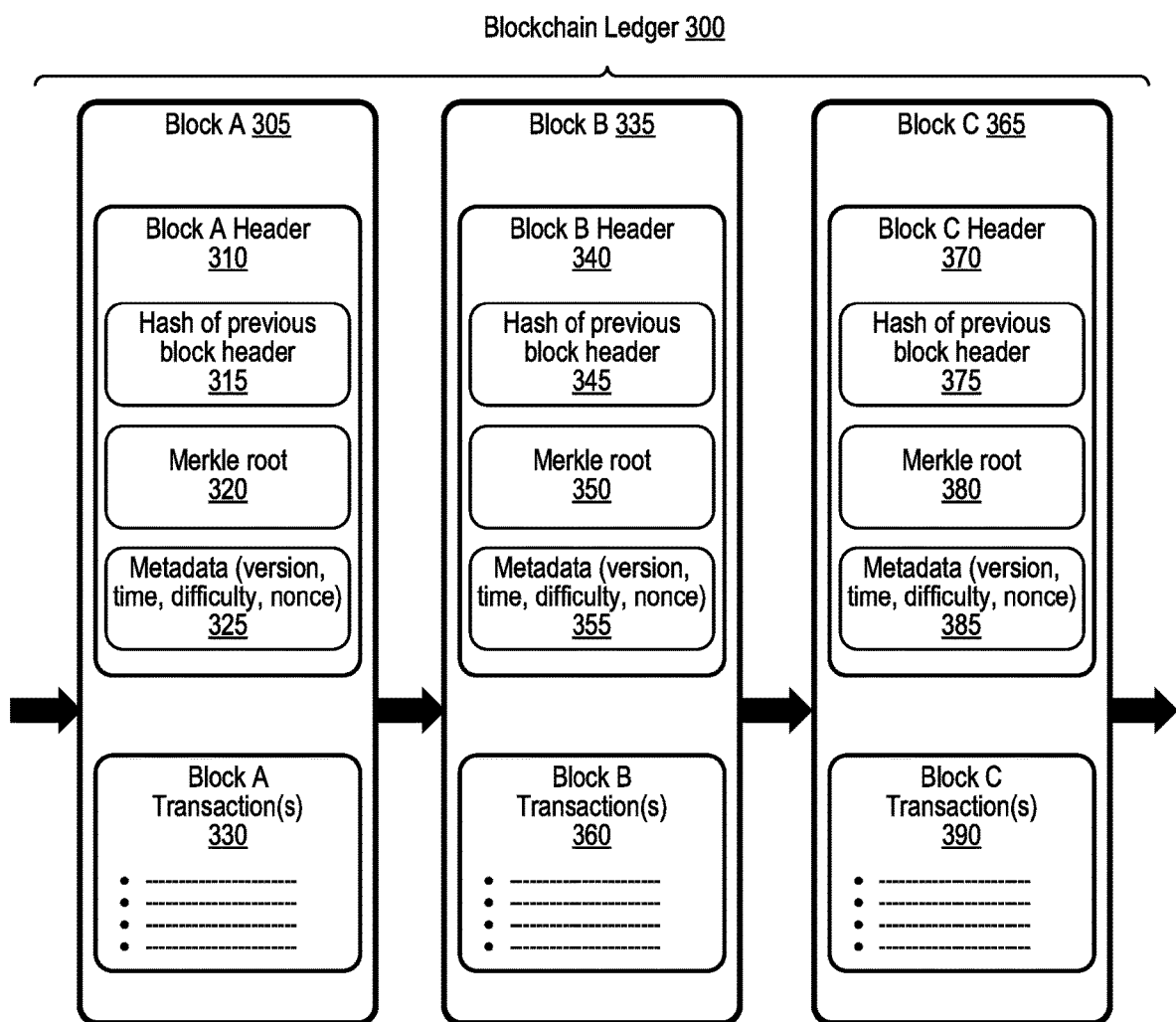
FIG. 3 illustrates a portion of a blockchain ledger that implements distributed product transaction tracking and authentication.

The distributed ledger(s) 130 illustrated in FIGS. 1A-1G are illustrated as blockchain ledgers with multiple blocks that each have a header and list one or more transactions as discussed further in FIG. 3.

The user device 120 discussed in FIG. 1A-1G is illustrated as a computing device 800 that is that is mobile, portable, battery-powered, handheld, or a combination thereof. The user device 120 need not be a computing device 800, but can still include one or more of the components of the computing device 800 discussed with respect to FIG. 8.

The NFC tags 110 discussed in FIG. 1A-1G may be passive NFC tags that rely on receiving power wirelessly from short-range wireless signals sent by the user device 120 or may alternately be active NFC devices that are powered by one or more electrically connected power sources such as batteries. Such active NFC devices may be computing devices 800 or may include one or more of the components of the computing device 800 discussed with respect to FIG. 8.

While elements 110 and 115 of FIG. 1A-1G are referred to as an "NFC tag" and "NFC signal(s)," these elements can alternately or additionally use a variety of other short-range wireless transceivers and short-range wireless signals, respectively. This can include any combination of wireless transceiver(s), signal(s), and/or protocol(s) discussed with respect to the input devices 860 and/or output devices 850 of FIG. 8. The short-range wireless signals 115 can in some cases represent unidirectional communication/transmissions—i.e., the short-range wireless transceiver 110 sending information and/or power via short-range wireless signal(s) 115 to the user device 120, or the user device 120 sending information and/or power via short-range wireless signal(s) 115 to the short-range wireless transceiver 110. The short-range wireless signals 115 can alternately be bidirectional communication/transmissions—i.e., the short-range wireless transceiver 110 sending information and/or power via short-range wireless signal(s) 115 to the user device 120, and the user device 120 sending information and/or power via short-range wireless signal(s) 115 to the short-range wireless transceiver 110. The "NFC tag 110" may also be replaced or supplemented with an optical glyph, such as a barcode or a quick response (QR) code, which may be scanned optically via one or more camera(s) of the user device 120. This optical glyph may encode any of the information discussed with respect to the NFC tag 110.

FIG. 1B illustrates retrieval of a shipping inventory of a product type as accessed from a distributed ledger using an NFC tag associated with a single product of the product type.

The product 105B illustrated in FIG. 1B is an object of a particular type (a "widget" product type) shipped and delivered to a user, for example in a package that at least partially covers the product 105 or object itself. For example, the product 105B may be a product ordered by a user from an online retailer and shipped to the user.

The NFC tag 110B of FIG. 1B may be coupled to the package covering the product 105B or to the product 105B itself that is at least partially within or inside the package. Like the doors of the vehicle product 105A of FIG. 1A, the package of the product 105B may require interaction with the NFC tag 110B and/or verification of the product 105B having been delivered according to the distributed ledger 130B and/or verification of identity of the user device 120B and/or its associated user via public/private keypair in order to open the package to remove and/or use the product 105B that is at least partially within the package.

The user device 110B of FIG. 1B displays an identification of the product 105B of FIG. 1B as a product of the "widget" type, which may be conveyed to the user device 110B via NFC signals 115B from the NFC tag 110B, via the distributed ledger(s) 130B of FIG. 1B, or both. The distributed ledger(s) 130B of FIG. 1B stores, and the user device 110B of FIG. 1B reads, parses, and displays, that in May of 2018, 61 products of the "widget" product type were purchased, 43 products of the "widget" product type were shipped, and 21 products of the "widget" product type were delivered; and that in June of 2018, 57 products of the "widget" product type were purchased, 52 products of the "widget" product type were shipped, and 19 products of the "widget" product type were delivered.

To provide these shipping inventory milestones, different user devices 120B add transactions to the distributed ledger(s) 130B, transitioning indicators representing product instances of the "widget" product type from a state "PURCHASED" to a state "SHIPPED," and from a state "SHIPPED" to a state "DELIVERED," in a manner similar to that of FIG. 4A. These different user devices 120B are user devices 120B that have scanned the NFC tag 110B and are verified as appropriate devices based on public-private keypair encryption of the NFC code from the NFC signal(s) 115B as discussed above. For example, a user device 120B associated with a customer or with the online retailer from which a particular product 105B of the "widget" product type was purchased can add the "purchased" indication into the distributed ledger 130, a user device 120B associated with shipping of the package containing the product 105B can add the "shipped" indication into the distributed ledger 130, and a user device 120B associated with either delivery personnel or a customer/recipient of the packages can add the "delivered" indication into the distributed ledger 130.

FIG. 1C illustrates retrieval of a manufacturing inventory of a product type as accessed from a distributed ledger using an NFC tag associated with a single product of the product type.

The product 105C illustrated in FIG. 1C is a product of a "diamond ring" product type, manufacture of which requires a number of steps. As with FIG. 1A and FIG. 1B, above, the NFC tag 110C may be coupled to the ring 105C itself or to packaging, such as a ring box. The identity of the product 105C as a product of a "diamond ring" product type may be stored in the NFC tag 110C and conveyed to the user device 120C via the wireless signals 115C, or may be stored in the distributed ledger(s) 130C and read by the user device 120C upon its retrieval, storage, and parsing of a copy of the distributed ledger(s) 130C.

The distributed ledger(s) 130C of FIG. 1C store(s), and the user device 110C of FIG. 1C reads, parses, and displays, a manufacturing supply chain inventory of products of the "diamond ring" product type. In particular, this manufacturing supply chain inventory identifies that there are 200 products of the "diamond ring" product type that are currently in the "diamond selected" stage of manufacture, that there are 150 products of the "diamond ring" product type that are currently in the "mold made" stage of manufacture, that there are 175 products of the "diamond ring" product type that are currently in the "wax case" stage of manufacture, that there are 125 products of the "diamond ring" product type that are currently in the "plaster form" stage of manufacture, that there are 80 products of the "diamond ring" product type that are currently in the "metal pouring" stage of manufacture, that there are 100 products of the "diamond ring" product type that are currently in the "polishing" stage of manufacture, and that there are 90 products of the "diamond ring" product type that are currently in the "finishing" stage of manufacture. Different user devices 120C of the distributed architecture 125C may add transactions corresponding to shifts in product amounts between these different manufacturing milestones to the distributed ledger(s) 130C as illustrated in FIG. 4A. Each of these devices may be computing devices 800 that are associated with one or more of the stages of manufacturing (e.g., diamond selection, molding, wax casting, plaster forms, metal pouring, polishing, finishing) in a manner that is verifiable via public-private keypair as discussed above.

FIG. 1D illustrates retrieval of a discount history of a product as accessed from a distributed ledger using an NFC tag associated with a single product of the product type.

The product 105D illustrated in FIG. 1D is a product of a "video game console" product type, distribution of which has a number of stops. As with FIG. 1A-1C above, the NFC tag 110D may be coupled to the video game console 105D itself or to packaging, such as a box, that at least partially contains the video game console 105D. The identity of the product 105D as is a product of a "video game console" product type may be stored in the NFC tag 110D and conveyed to the user device 120D via the wireless signals 115D, or may be stored in the distributed ledger(s) 130D and read by the user device 120D upon its retrieval, storage, and parsing of a copy of the distributed ledger(s) 130D.

The distributed ledger(s) 130D of FIG. 1D store(s), and the user device 110D of FIG. 1D reads, parses, and displays, a discount/coupon history of products of the "video game console" product type. In particular, this discount/coupon history identifies that there was a 20% off discount/coupon for products of the "video game console" product type in April of 2018, that there was no discount/coupon for products of the "video game console" product type in May of 2018, that there was a $5 off discount/coupon for products of the "video game console" product type in June of 2018, that there was a "buy one get one half off" (BOGOHO) discount/coupon for products of the "video game console" product type in July of 2018, that there was a 10% off discount/coupon for products of the "video game console" product type in August of 2018, and that there was a no discount/coupon for products of the "video game console" product type in September of 2018. Different user devices 120D of the distributed architecture 125D may add transactions corresponding to changes between these different discount/coupon regimes in a manner similar to FIG. 4A or FIG. 4B. Each of these devices may be computing devices 800 that are associated with providers such as retailers, distributors, manufacturers, or other types of provides discussed herein.

FIG. 1E illustrates retrieval of a sales history of products related to a product type accessed from a distributed ledger using an NFC tag associated with a single product of the product type.

The product 105E illustrated in FIG. 1E is a product of an "inkjet printer" product type, which has a number of related products such as paper and ink in colors such as black, yellow, cyan, magenta. As with FIG. 1A-1D above, the NFC tag 110E may be coupled to the printer 105E itself or to packaging, such as a box, that at least partially contains the printer 105E. The identity of the product 105E as a product of an "inkjet printer" product type may be stored in the NFC tag 110E and conveyed to the user device 120E via the wireless signals 115E, or may be stored in the distributed ledger(s) 130E and read by the user device 120E upon its retrieval, storage, and parsing of a copy of the distributed ledger(s) 130E.

The distributed ledger(s) 130E of FIG. 1E store(s), and the user device 110E of FIG. 1E reads, parses, and displays, a sales history of products of product types that are related to the "inject printer" product type. In particular, this sales history identifies that, in 2018, 550 products of the "inkjet printer" product type were sold, 750 products of the "paper" product type were sold, 200 products of the "black ink" product type were sold, 150 products of the "cyan ink" product type were sold, 150 products of the "yellow ink" product type were sold, and 125 products of the "magenta ink" product type were sold.

Different user devices 120E of the distributed architecture 125E may add transactions corresponding to these different sales to the distributed ledger(s) 130E in the manner illustrated in FIG. 4B. Each of these devices may be computing devices 800 that are associated with purchase of the printer 105E itself or one of the related products, such as a user device 110E of the customer buying the printer 105E itself or one of the related products, or a user device 110E of a retail employee or online retailer server (or another provider) selling the printer 105E itself or one of the related products, in a manner that is verifiable via public-private keypair as discussed above.

In some cases, the distributed ledger(s) 130E of FIG. 1E store(s) data identifying one or more retail employees that were able to sell one or more related products in a particular sales transaction and/or one or more consumers who purchased one or more related products in a particular purchase transaction. Such sales and purchase transactions may also be monitored to automatically identify new related products. For instance, using the printer example of FIG. 1E, a new type of photo paper may come in stock, and may be identified as an "upsell" product related to the inkjet printer due to a number of purchases by the same customer, either in the same sales/purchase transaction or over time—and/or by the same retail employee, for example if the retail employee specializes in printers and related products. In another example, if the product 105E were a shoe, then related products could include shoelaces, shoehorns, shoe polish, leather conditioner, leather care oil, suede waterproofing fluid, shoe trees, shoe polish, shoe shine, shoe brushes, shoe shine cloth, and the like.

Figure 1F:
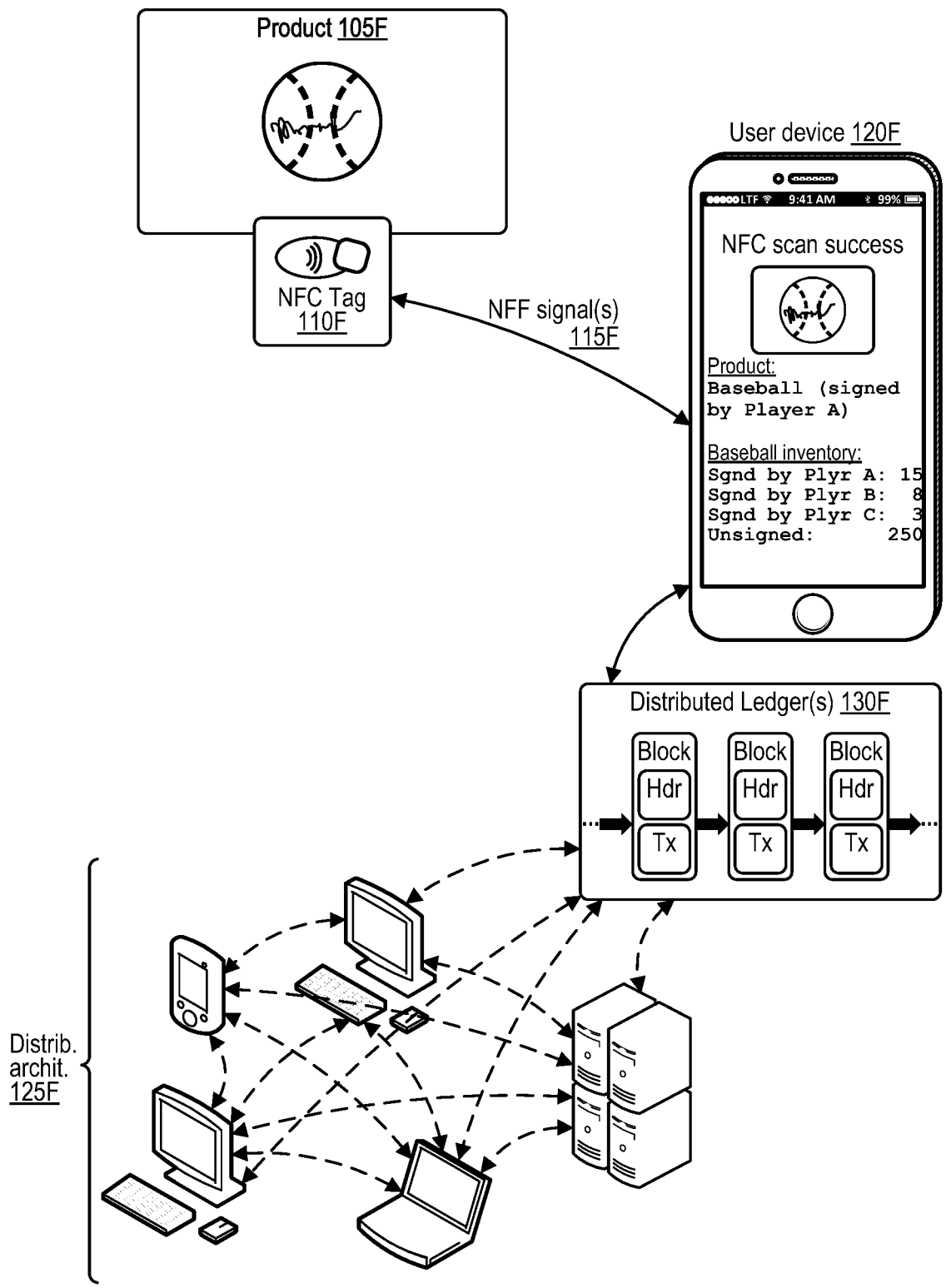
FIG. 1F illustrates retrieval of an inventory of multiple variants of a product type as accessed from a distributed ledger using an NFC tag associated with a single product of the product type.

FIG. 1F illustrates retrieval of an inventory of multiple variants of a product type as accessed from a distributed ledger using an NFC tag associated with a single product of the product type.

The product 105F illustrated in FIG. 1F is a product of a "baseball" product type with the additional trait of "signed by Player A." As with FIG. 1A-1E above, the NFC tag 110F may be coupled to the autographed baseball 105F itself or to packaging, such as a box, that at least partially contains the autographed baseball 105F. The identity of the product 105F as a product of a "baseball" product type and/or the additional trait of "signed by Player A" may be stored in the NFC tag 110F and conveyed to the user device 120F via the wireless signals 115F, or may be stored in the distributed ledger(s) 130F and read by the user device 120F upon its retrieval, storage, and parsing of a copy of the distributed ledger(s) 130F.

The distributed ledger(s) 130F of FIG. 1F store(s), and the user device 110F of FIG. 1F reads, parses, and displays, a provider inventory of products of the "baseball" product type, and different variants thereof. In particular, the provider inventory identifies that the provider has 15 products of the "baseball" product type with the additional trait "signed by Player A," that the provider has 8 products of the "baseball" product type with the additional trait "signed by Player B," that the provider has 3 products of the "baseball" product type with the additional trait "signed by Player C," that the provider has 250 products of the "baseball" product type without any additional trait or alternately with additional trait "unsigned."

Different user devices 120F of the distributed architecture 125F may add transactions corresponding to these different uses of the autographed baseball 105F to the distributed ledger(s) 130F in the manner illustrated in FIG. 4A or FIG. 4B. Each of these devices may be computing devices 800 that are associated with use of the autographed baseball 105F, such as user devices 120F corresponding to baseball players using the autographed baseball 105F or to stadium staff at the stadiums at which the autographed baseball 105F is used, in a manner that is verifiable via public-private keypair as discussed above.

Figure 1G:
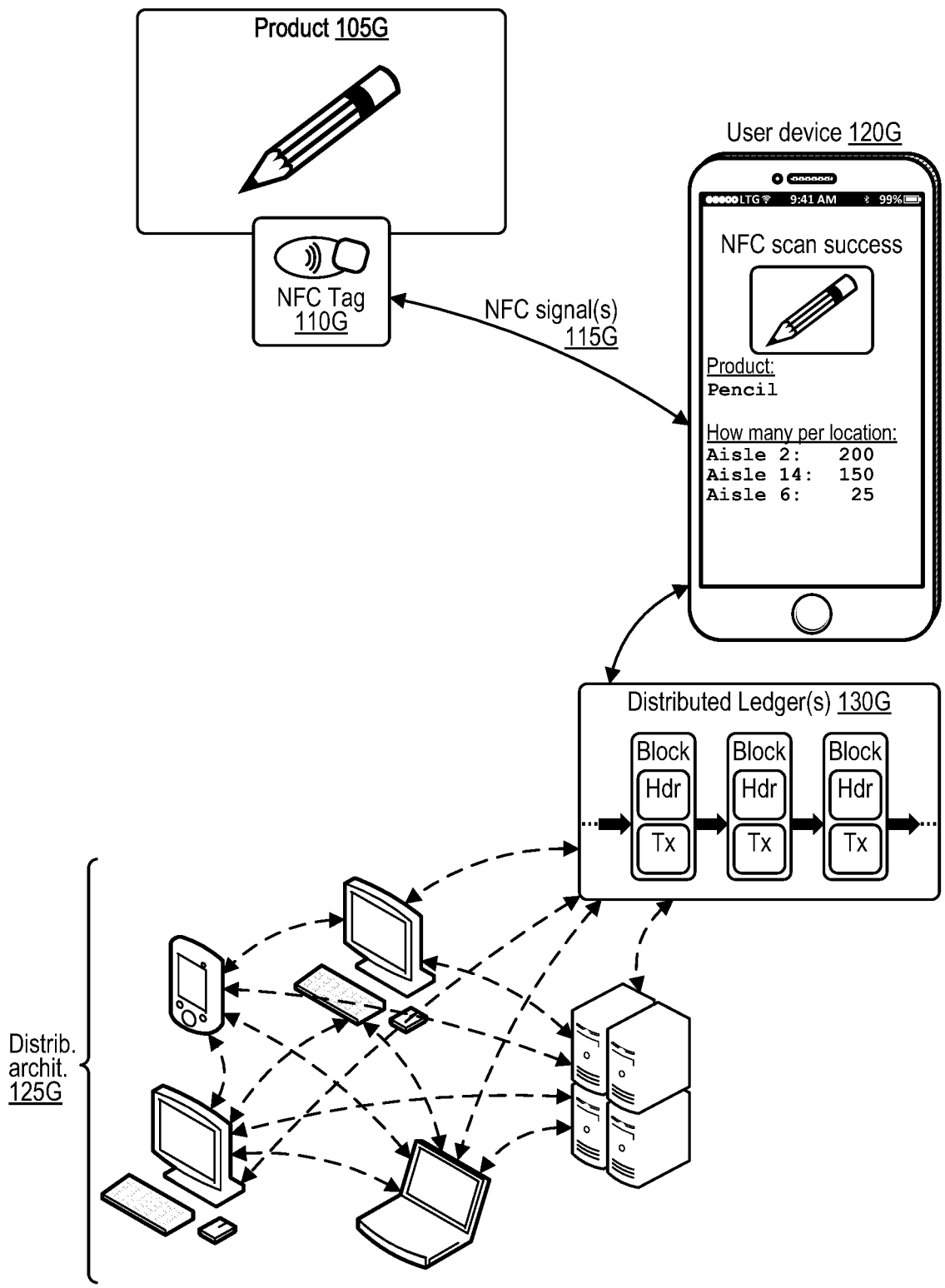
FIG. 1G illustrates retrieval of a location-based inventory of a product as accessed from a distributed ledger using an NFC tag associated with a single product of the product type.

FIG. 1G illustrates retrieval of a location-based inventory of a product as accessed from a distributed ledger using an NFC tag associated with a single product of the product type.

The product 105G illustrated in FIG. 1G is a product of a "pencil" product type, which is moved to different aisles of a retail store or warehouse associated with a provider. As with FIG. 1A-1F above, the NFC tag 110G may be coupled to the pencil 105G itself or to packaging, such as a box, that at least partially contains the pencil 105G. The identity of the product 105G as a product of the "pencil" product type may be stored in the NFC tag 110G and conveyed to the user device 120G via the wireless signals 115G, or may be stored in the distributed ledger(s) 130G and read by the user device 120G upon its retrieval, storage, and parsing of a copy of the distributed ledger(s) 130G.

The distributed ledger(s) 130F of FIG. 1G store(s), and the user device 110G of FIG. 1G reads, parses, and displays a location-based inventory of products of the "pencil" product type. In particular, the location-based inventory identifies that there are 200 products of the "pencil" product type in aisle 2 of the store/warehouse, that there are 150 products of the "pencil" product type in aisle 14 of the store/warehouse, and that there are 25 products of the "pencil" product type in aisle 6 of the store/warehouse. While the term "aisle" is used for illustration, this could be used to convey rows, columns, coordinate systems (such as latitude and longitude), street names, or other indications of absolute or relative location/position.

Different user devices 120G of the distributed architecture 125G may add transactions corresponding to these different locations of the pencil 105G to the distributed ledger(s) 130G in the manner illustrated in FIG. 4A. Each of these devices may be computing devices 800 that are associated with positioning or moving of the pencil 105G, such as user devices 120G corresponding to retail employees that stock shelves of a retail store or to warehouse employees in charge of arranging items in a warehouse, user devices 120G that themselves move items in a retail store or warehouse, user devices 120G that provide tracking services such as GNSS receiver devices, or combinations thereof, in a manner that is verifiable via public-private keypair as discussed above.

Figure 2A:
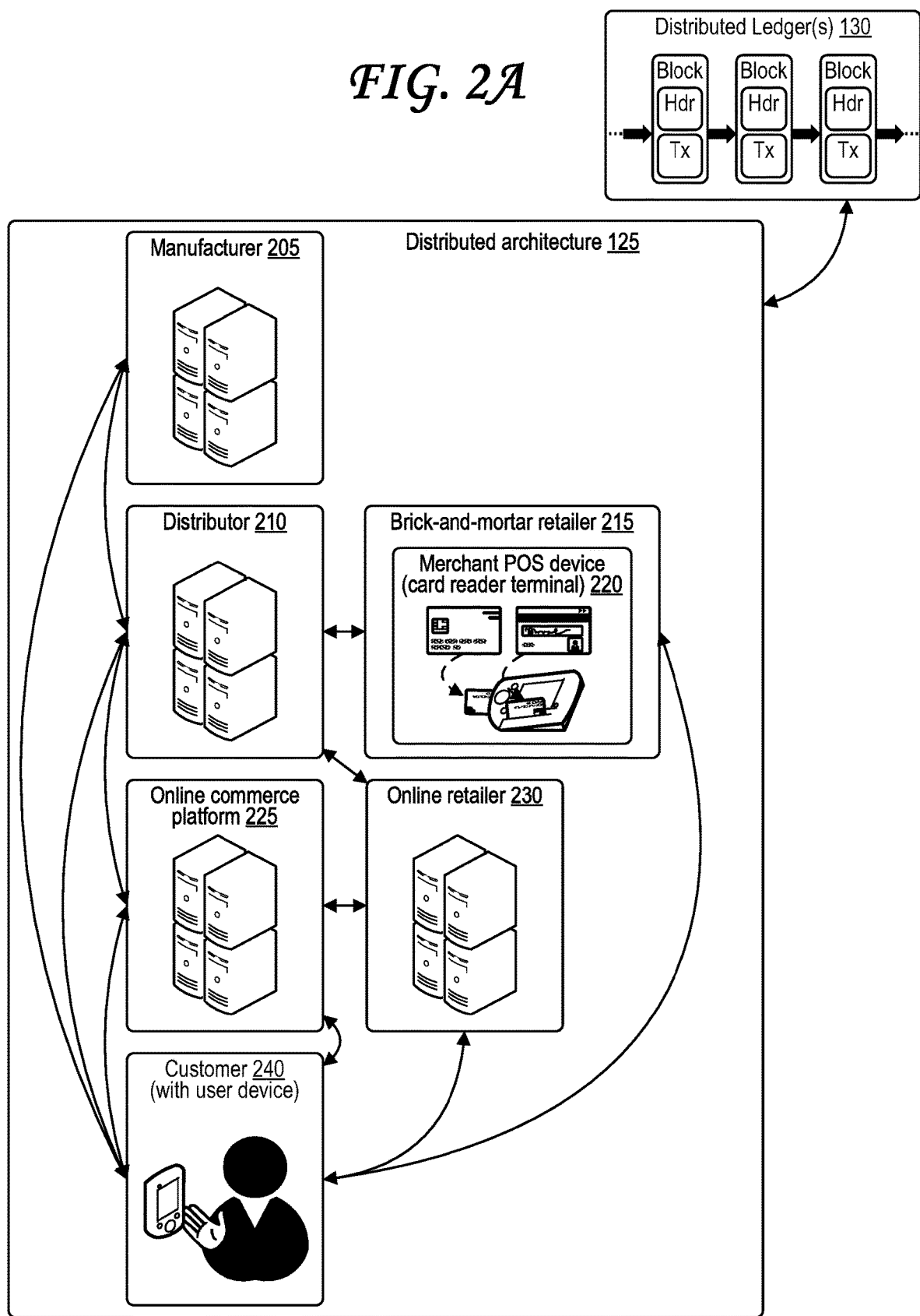
FIG. 2A illustrates a distributed architecture supporting the distributed ledger, the distributed architecture including different classes of devices along a commercial supply chain.

FIG. 2A illustrates a distributed architecture supporting the distributed ledger, the distributed architecture including different classes of devices along a commercial supply chain.

The distributed architecture 125 illustrated in FIG. 2A includes various computing devices 800 that each optionally store copies of various distributed ledger(s) 130, each of which may on occasion request transactions to be added to the distributed ledger(s) 130, verify requested transactions for the distributed ledger(s) 130, generate new blocks that each store one or more verified transactions for the distributed ledger(s) 130, append new blocks to the distributed ledger(s) 130, distribute new blocks to the other computing devices 800 of the distributed architecture 125, or combinations thereof. Each of these computing devices 800 of the distributed architecture 125 may also be referred to as a user device 120 corresponding to a particular user or type of user.

The computing devices 800 of the distributed architecture 125 illustrated in FIG. 2A include: one or more manufacturer devices 205 corresponding to one or more manufacturers of a product 105, one or more distributor devices 210 corresponding to one or more distributors that distribute the product 105, one or more physical (brick-and-mortar) retailer devices 215 corresponding to one or more physical (brick-and-mortar) retailers selling the product 105, one or more online commerce platform devices 225 corresponding to one or more online commerce platforms helping sell the product 105, one or more online retailer devices 230 corresponding to a one or more online retailers selling the product 105, or one or more customer user devices 240 corresponding to a one or more customers purchasing the product 105. The physical (brick-and-mortar) retailer devices 215 corresponding to a one or more physical (brick-and-mortar) retailers of a product 105 may, for example, be point of sale (POS) devices 220 such as card reader terminals capable of reading payment instruments such as magnetic stripe cards, integrated circuit chip (ICC) cards, or NFC payment instruments.

The various arrows between the computing devices 800 of the distributed architecture 125 illustrated in FIG. 2A indicate potential paths that the product 105 can take. The manufacturer(s) 205 can give the product 105 directly to any of the other entities illustrated in FIG. 2A. The customer can buy the product 105 directly from the manufacturer 205, from the distributor 210, from the physical retailer 215, from the online commerce platform 225, from the online retailer 230, or from another customer 240. All of the entities in between the manufacturer 205 and customer 240 can distribute the product 105 amongst themselves; even physical retailers sometime have corresponding online storefronts with which they can share products 105 offered to customers 240.

The online commerce platform device(s) 225 and/or online retailer device(s) 230 may also be referred to, either individually or together, as an ordering website network.

FIG. 2B illustrates elements optionally included among the devices in the distributed architecture of FIG. 2A.

Figure 13:
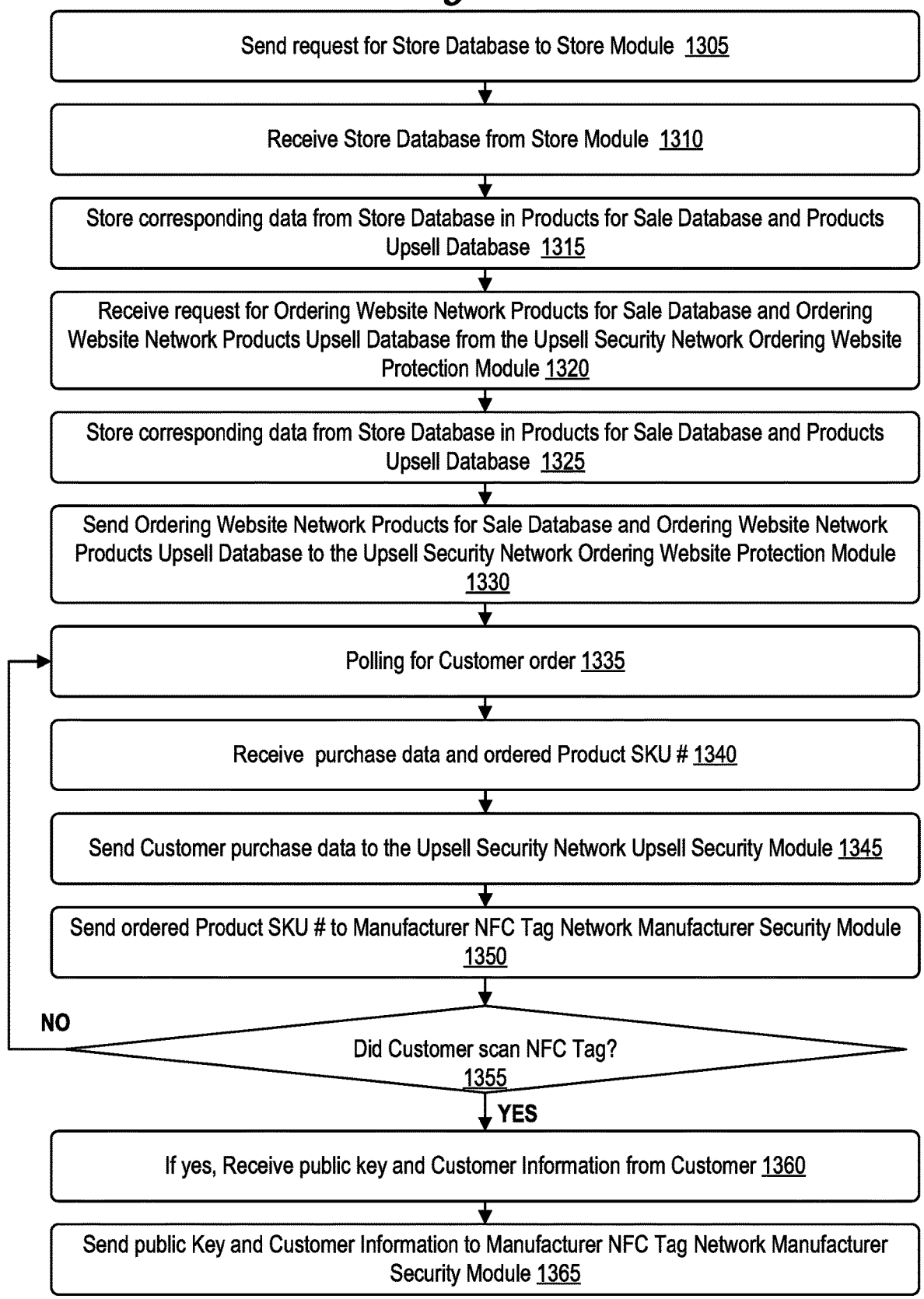
FIG. 13 is a flow diagram illustrating operations for secure purchase orders from an online retailer.

The optional databases, components, and modules illustrated in FIG. 2B represent data structures for storing information, such as those of FIG. 13 and FIG. 16, hardware devices/components, and/or software modules that are stored by and run on the devices that they are illustrated over to provide functionality discussed in the flow diagrams of FIG. 9, FIG. 10, FIG. 11, FIG. 12, FIG. 14, FIG. 15, FIG. 17, and FIG. 18.

The manufacturer device(s) 205 may include a NFC Manufacturer Database, a Manufacturer Security Module, a Customer Database, and a Manufacturer Reseller Module. The distributor device(s) 210 and/or physical retailer device(s) 215 may include Products for Sale Database, a Products Upsell Database, a Retailer Security Module, and an NFC reader. The online commerce platform device(s) 225 and/or online retailer device(s) 230 may include Products for Sale Database, a Products Upsell Database, a Customer Information Module, and a Retail User Interface. The customer user device 240 may include an NFC reader. A product 105 or object 105 with an NFC tag 110, which may be collectively referred as a product 260 or object 260, may include NFC Manufacturing URL Data—that is, an address (e.g., Uniform Resource Locator or URL or another type of hyperlink or pointer) of one or more distributed ledger(s) 130 relevant to the object 260—and may also include an NFC customer code or NFC code as discussed above. The distributed architecture may optionally also include one or more computing devices 800 referred to as an upsell security network 255, which may store information about groupings of related products (see e.g., FIG. 1F) and which may include an Upsell Security Database, an Ordering Website Protection Module, a Retail Protection Module, and a Comm Portal.

The distributed ledger(s) 130 themselves may each include or correspond to blockchain data (e.g., headers and transactions), pre-mined tokens (e.g., cryptocurrency as discussed in step 730 of FIG. 7A), and a blockchain security module for using the distributed ledger(s) 130 as a way to securely store information about the transactions discussed herein.

FIG. 3 illustrates a portion of a blockchain ledger that implements distributed product transaction tracking and authentication. Three blocks—Block A 305, Block B 335, and Block C 365—of the blockchain ledger 300 are illustrated in FIG. 3.

Each block includes a block header 310/340/370 and a list of one or more transactions 330/360/390. The block header 310 includes a hash of the block header of the previous block 315/345/375, which may alternately be replaced or supplemented by a hash of the entire previous block. For instance, the header 370 of block C 365 includes a hash 375 of the header 340 of block B 335. The header 340 of block B 335 likewise includes a hash 345 of the header 310 of block A 305. The header 310 of block A 305 likewise includes a hash 315 of a header (not pictured) of previous block (not pictured) that is before block A 305 in the blockchain 300. Including the hash of the previous block's header secures the blockchain ledger 300 by preventing modification of any block of the blockchain 300 after the block has been entered into the blockchain 300, as any change to a particular block would cause that block header's hash in the next block to be incorrect. Further, modification of that block header's hash in the next block would make the next block's header's hash in the block after the next block incorrect, and so forth.

Figure 5:
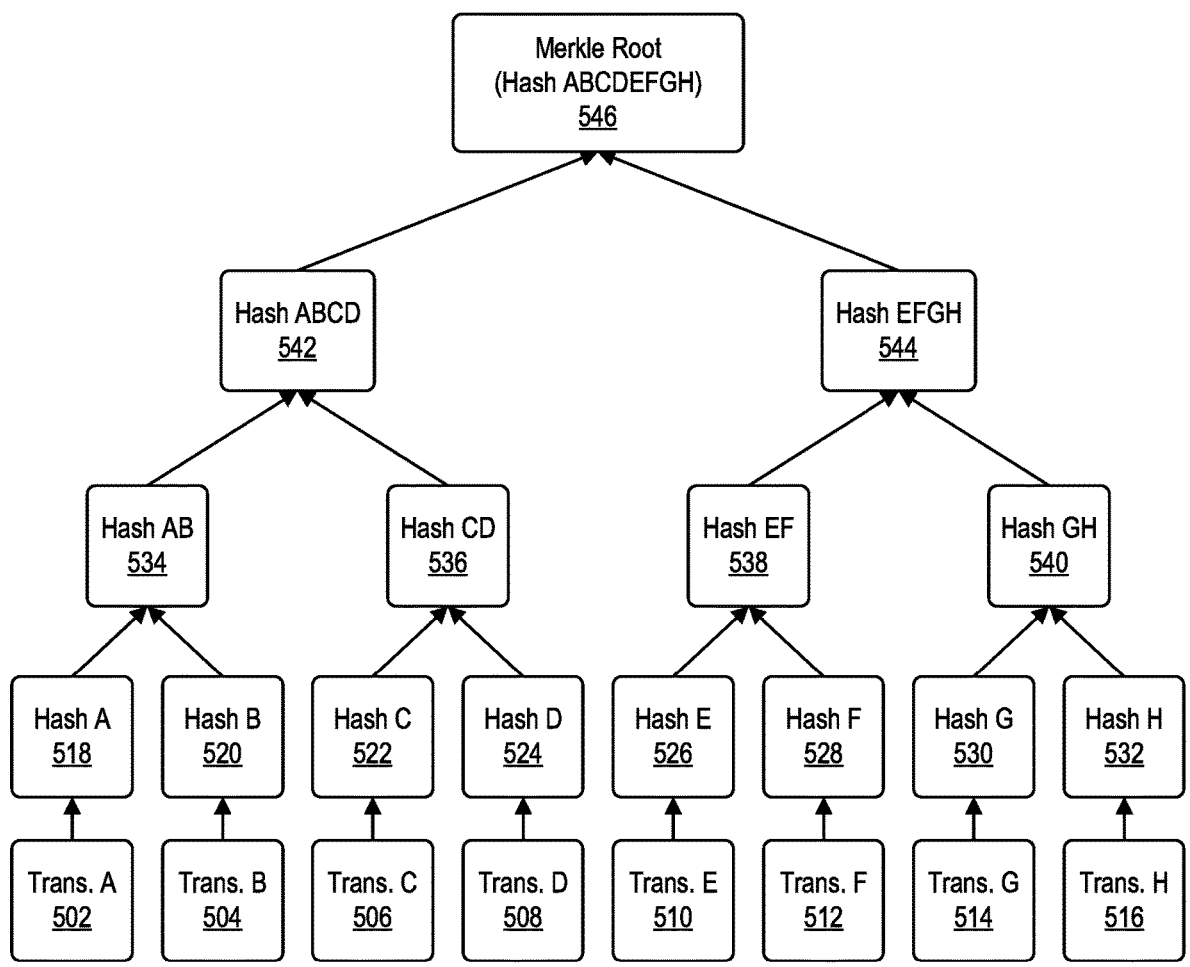
FIG. 5 is a diagram of a Merkle tree for securing product transaction tracking and authentication using the distributed ledger.

Each block's block header 310/340/370 also includes a Merkle root 320/350/380, which is generated based on hashes of the transaction(s) listed in the list of transaction(s) 330/360/390 for that block as explained further with respect to FIG. 5. Any attempt to modify a transaction after the block has been entered would change the Merkle root 320/350/380, which would change the hash 315/345/375 of the block header 310/340/370, again allowing all nodes to see if any block has been tampered with.

Figure 7:
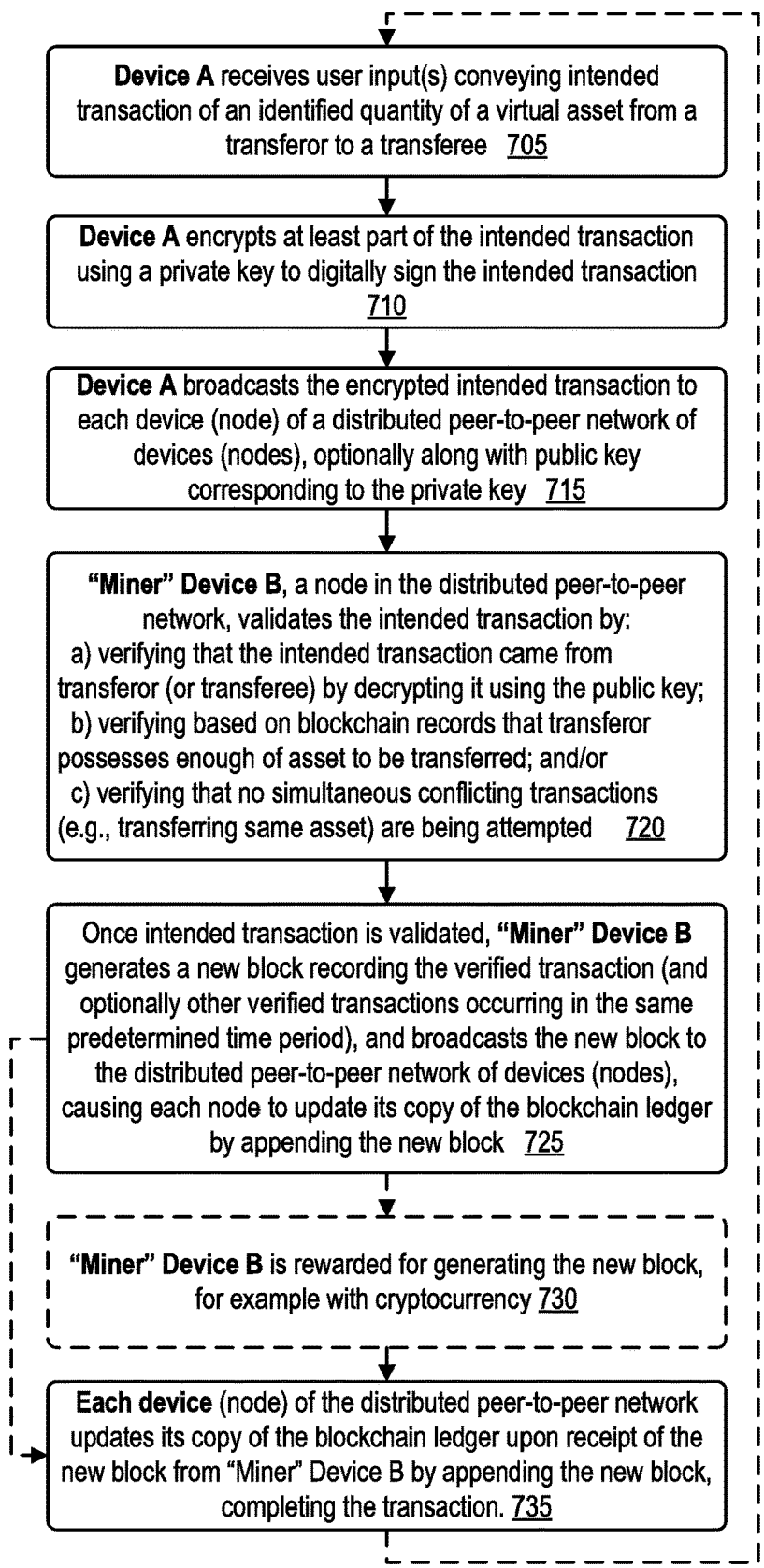
FIG. 7A is a flow diagram illustrating operations through which a new block is generated for the distributed ledger.
FIG. 7B is a flow diagram illustrating operations through which generation of a new blocks for the distributed ledger is optionally incentivized.

Each block's block header 310/340/370 may also include various elements of metadata, such as a version number for the blockchain ledger platform, a version number for the block itself that identifies how many nonces have been tried, a timestamp for verification of each transaction, a timestamp for generation of the block, a difficulty target value as discussed with respect to FIG. 7A AND FIG. 7B, a nonce value as discussed with respect to FIG. 7A AND FIG. 7B, or a combination thereof.

Each block 305/335/365 of the blockchain 300 also includes a list of one or more transaction(s) 330/360/390. Each of these transactions 330/360/390 may be identified in a similar matter to the transactions 410 or 425 of FIG. 4A and FIG. 4B. These transactions may convey information corresponding to, for example, an ownership history as in FIG. 1A, a shipping history as in FIG. 1B, a manufacturing history as in FIG. 1C, a distribution history as in FIG. 1D, a history of user purchases of related products as in FIG. 1E, an item usage history as in FIG. 1F, a location/position history as in FIG. 1G, other characteristics or conditions of a product/object/item 105 that change over time, or combinations thereof.

While FIG. 3 only illustrates three blocks 305/335/365 of the blockchain 300, it should be understood that any blockchain discussed herein may be longer or shorter in that it may have more or fewer than three blocks.

FIG. 4A illustrates transactions related to supply chain stages of items of two item types as recorded via distributed ledger.

Box 405 of FIG. 4A identifies which supply chain stages include which of the three items before the transactions 410. In particular, box 405 indicates that entity MANUFACTURE_BEGINS corresponding to the start of the manufacturing process includes 50 of ITEM_A and 10 of ITEM_B; entity MANUFACTURE_COMPLETE corresponding to the completion of the manufacturing process includes 40 of ITEM_A and 20 of ITEM_B; entity QUALITY_ASSURANCE corresponding to the quality assurance process includes 30 of ITEM_A and 10 of ITEM_B; entity DISTRIBUTION_SHIPPING corresponding to the shipping of an item for distribution and includes 20 of ITEM_A and 20 of ITEM_B; entity DISTRIBUTION_DELIVERY corresponding to the delivery of an item for distribution includes 10 of ITEM_A and 10 of ITEM_B; entity STOCKED_LOCALLY corresponding to the stocking of an item at an online or physical retail location includes 20 of ITEM_A and 20 of ITEM_B; entity PURCHASED_BY_CUSTOMER corresponding to an item being purchased from an online or physical retailer by a customer includes 30 of ITEM_A and 10 of ITEM_B; entity CUSTOMER_SHIPPING corresponding to an item being shipped to a customer includes 40 of ITEM_A and 20 of ITEM_B; and entity CUSTOMER_DELIVERY corresponding to an item being delivered to a customer includes 50 of ITEM_A and 10 of ITEM_B.

The transactions 410 of FIG. 4A each identify a value of a transfer, a transferee entity, a transferor entity, and a signature, which may be a hash of the transaction of any of the hash types discussed herein at least with respect to FIG. 5. The first of the transactions 410 (with signature BA7816BF8F01CFEA414) indicates that 20 of ITEM_A is to be transferred from entity MANUFACTURE_BEGINS to entity MANUFACTURE_COMPLETE, indicating that manufacture of the 20 of ITEM_A that had begun in the time state characterized by box 405 has now completed. The second of the transactions 410 (with signature AB8896967C7979F976G) indicates that 10 of ITEM_B is to be transferred from entity PURCHASED_BY_CUSTOMER to entity CUSTOMER_SHIPPING, indicating that the 10 of ITEM_B that had been purchased by one or more customers in the time state characterized by box 405 and are now shipping to the one or more customers. The third of the transactions 410 (with signature GA8796F79879876C977) indicates that 10 of ITEM_A is to be transferred from entity CUSTOMER_SHIPPING to entity CUSTOMER_DELVERY, indicating that the 10 of ITEM_C that had been shipped to one or more customers in the time state characterized by box 405 has now been delivered to the one or more customers. The transactions 410 can be grouped into a single block of a distributed ledger 130 such as the blockchain ledger of FIG. 3 or into multiple blocks.

Box 415 of FIG. 4A identifies which supply chain stages include which of the three items after the transactions 410. In particular, box 405 indicates that entity MANUFACTURE_BEGINS corresponding to the start of the manufacturing process includes 30 of ITEM_A and 10 of ITEM_B; entity MANUFACTURE_COMPLETE corresponding to the completion of the manufacturing process includes 60 of ITEM_A and 20 of ITEM_B; entity QUALITY_ASSURANCE corresponding to the quality assurance process includes 30 of ITEM_A and 10 of ITEM_B; entity DISTRIBUTION_SHIPPING corresponding to the shipping of an item for distribution and includes 20 of ITEM_A and 20 of ITEM_B; entity DISTRIBUTION_DELIVERY corresponding to the delivery of an item for distribution includes 10 of ITEM_A and 10 of ITEM_B; entity STOCKED_LOCALLY corresponding to the stocking of an item at an online or physical retail location includes 20 of ITEM_A and 20 of ITEM_B; entity PURCHASED_BY_CUSTOMER corresponding to an item being purchased from an online or physical retailer by a customer includes 30 of ITEM_A and 0 of ITEM_B; entity CUSTOMER_SHIPPING corresponding to an item being shipped to a customer includes 30 of ITEM_A and 30 of ITEM_B; and entity CUSTOMER_DELIVERY corresponding to an item being delivered to a customer includes 60 of ITEM_A and 10 of ITEM_B. Thus, the 20 of ITEM_A referenced in box 405 and the first of the transactions 410 has completed manufacturing, the 10 of ITEM_B referenced in box 405 and the second of the transactions 410 were shipped to customer(s), and the 10 of ITEM_A referenced in box 405 and the third of the transactions 410 were delivered to the customer(s).

FIG. 4B illustrates transactions related to provider inventories of items of three item types as recorded via distributed ledger.

Box 420 of FIG. 4B identifies which of four entities (PRV_AUSTIN, PRV_BOISE, PRV_CHICO) possess how much of three types of items (ITEM_A, ITEM_B, ITEM_C) before the transactions 425. In particular, box 420 indicates that entity PRV_AUSTIN corresponding to a provider in Austin, Tex. possesses 30 one ITEM_A and 20 of ITEM_B and 10 of ITEM_C; entity PRV_BOISE corresponding to a provider in Boise, Id. possesses 10 of ITEM_A and 30 of ITEM_B and 0 of ITEM_C; and entity PRV_CHICO corresponding to a provider in Chico, Calif. possesses 0 of ITEM_A and 10 of ITEM_B and 20 of ITEM_C. Finally entity CSTMR_DAVID corresponding to a customer ("David") and possesses 0 of each of ITEM_A, ITEM_B, and ITEM_C.

The transactions 425 of FIG. 4B each identify a value of a transfer, a transferee entity, a transferor entity, and a signature, which may be a hash of the transaction of any of the hash types discussed herein at least with respect to FIG. 5. The first of the transactions 425 (with signature 969678FAFF96697FFCB) indicates that 10 of ITEM_A is to be transferred from entity PRV_AUSTIN to entity PRV_BOISE, indicating that the provider in Austin has transferred 10 of ITEM_A to the provider in Boise. The second of the transactions 425 (with signature 9713CBDA9796-DDB7AFF) indicates that 15 of ITEM_B is to be transferred from entity PRV_BOISE to entity PRV_CHICO, indicating that the provider in Boise has transferred 15 of ITEM_B to the provider in Chico. The third of the transactions 425 (with signature FFA987332BCC797A12C) indicates that 5 of ITEM_C is to be transferred from entity PRV_CHICO to entity CSTMR_DAVID, indicating that the provider in Chico has sold or otherwise given 5 of ITEM_C to customer David. The transactions 425 can be grouped into a single block of a distributed ledger 130 such as the blockchain ledger of FIG. 3 or into multiple blocks.

Box 430 of FIG. 4B identifies which of the three users possess which of the three vehicle items after the transactions 425. In particular, box 420 indicates that entity PRV_AUSTIN corresponding to a provider in Austin, Tex. possesses 20 one ITEM_A and 20 of ITEM_B and 10 of ITEM_C; entity PRV_BOISE corresponding to a provider in Boise, Id. possesses 20 of ITEM_A and 15 of ITEM_B and 0 of ITEM_C; and entity PRV_CHICO corresponding to a provider in Chico, Calif. possesses 0 of ITEM_A and 25 of ITEM_B and 15 of ITEM_C. Finally entity CSTMR_DAVID corresponding to a customer ("David") and possesses 0 of ITEM_A, 0 of ITEM_B, and 5 of ITEM_C.

FIG. 5 is a diagram of a Merkle tree for securing product transaction tracking and authentication using the distributed ledger.

The Merkle tree of FIG. 5 is used to generate a Merkle root 546 for a block with 8 transactions: transaction A 502, transaction B 504, transaction C 506, transaction D 508, transaction E 510, transaction F 512, transaction G 514, and transaction H 516.

A hash is generated for each transaction. Transaction A 502 is hashed into hash A 518, transaction B 504 is hashed into hash B 520, transaction C 506 is hashed into hash C 522, transaction D 508 is hashed into hash D 524, transaction E 510 is hashed into hash E 526, transaction F 512 is hashed into hash F 528, transaction G 514 is hashed into hash G 530, and transaction H 516 is hashed into hash H 532.

Each of the hashes A 518 through H 532 are hashed after being paired with another hash. That is, Hash A 518 and Hash B 520 are hashed together into Hash AB 534, Hash C 522 and Hash D 524 are hashed together into Hash CD 536, Hash E 526 and Hash F 528 are hashed together into Hash EF 538, and Hash G 530 and Hash H 532 are hashed together into Hash GH 540.

This process repeats until a single hash results. That is, Hash AB 534 and Hash CD 536 are hashed together into Hash ABCD 542, and Hash EF 538 and Hash GH 540 are hashed together into Hash EFGH 544. Hash ABCD 542 and Hash EFGH 544 are hashed together into Hash ABCDEFGH 546. Hash ABCDEFGH 546 is also known as the Merkle root 546 for the 8 transactions: transaction A 502, transaction B 504, transaction C 506, transaction D 508, transaction E 510, transaction F 512, transaction G 514, and transaction H 516. Any modification to any of these 8 transactions also necessarily changes the Merkle root 546, which can be verified by any node to ensure that no changes were made to the transactions in any given block.

Figure 6:
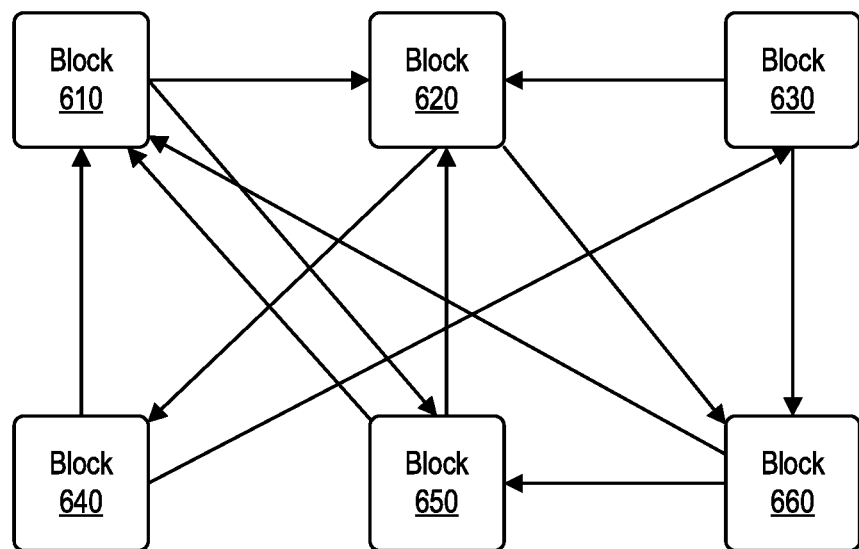
FIG. 6 illustrates a portion of a distributed directed acyclic graph (DAG) ledger that implements distributed product transaction tracking and authentication.

The hashes used in the Merkle root calculation of FIG. 5, the hashes of previous block discussed with respect to FIG. 3, and the hashes of parent blocks discussed with respect to FIG. 6, are generated using a hash algorithm, which may optionally be a secure hash algorithm (SHA), such as SHA-0, SHA-1, SHA-2, SHA-3, SHA-N, SHA-128, SHA-192, SHA-256, SHA-512, SHA-224, SHA-384, SHA-512/224, SHA-512/256, SHA3-224, SHA3-256, SHA3-384, SHA3-512, SHAKE128, or one or more variants or combinations thereof.

FIG. 6 illustrates a portion of a distributed directed acyclic graph (DAG) ledger that implements distributed product transaction tracking and authentication.

While FIG. 3, FIG. 7A, and FIG. 7B discuss use of a blockchain ledger, it should be understood that a non-linear ledger structure, such as the directed acyclic graph (DAG) ledger structure of FIG. 6, may be used instead of a blockchain ledger discussed herein. That is, the term "distributed ledger" as used herein should be understood to refer to at least one of a blockchain ledger (as in FIG. 3), a DAG ledger (as in FIG. 6), or a combination thereof. In a DAG ledger, each block header includes the hashes of block headers of a predetermined number of other "parent" blocks in the DAG ledger selected either at random or in some other non-linear manner, rather than the hash of a single previous block in the blockchain. Each block header may alternately or additionally include hashes of the entire parent blocks instead of hashes of just the headers of the parent blocks. Where each block header includes multiple hashes corresponding to different parent blocks or their headers, these hashes can be combined together into a Merkle root much like the hashes A 518, B 520, C 522, D 524, E 526, F 528, G 530, and H 532 of FIG. 5.

For example, in the DAG ledger of FIG. 6, the predetermined number is two, at least after the first two blocks are generated. In the web DAG ledger of FIG. 6, the parent blocks are indicated using arrows. Block 610 includes hashes of the block headers of parent blocks 620 and 650. Block 620 includes hashes of the block headers of parent blocks 640 and 660. Block 630 includes hashes of the block headers of parent blocks 620 and 660. Block 640 includes hashes of the block headers of parent blocks 610 and 630. Block 650 includes hashes of the block headers of parent blocks 610 and 620. Block 660 includes hashes of the block headers of parent blocks 610 and 650. The resulting structure is a directed acyclic graph (DAG) of blocks, where each vertex block includes a hash of its parent vertex block(s), rather than a linear stream of blocks as in a blockchain. A DAG ledger may sometimes be referred to as a "web," a "tangle," or a "hashgraph."

In some cases, the number of parent blocks in a DAG ledger is not strictly predetermined, but there is a predetermined minimum number of blocks, such as a two-parent minimum or a one-parent minimum, meaning that each block has at least the predetermined minimum number of parent blocks. In some cases, each block in a DAG ledger may only identify only a single transaction rather than multiple transactions, and may therefore forego a Merkle root and/or replace it with a hash of the single transaction. In other implementations, each block may identify multiple transactions associated with a predetermined time period as discussed herein.

Potential benefits of distributed DAG ledgers over blockchain ledgers may include parallelized validation, which results in higher throughput.

FIG. 7A is a flow diagram illustrating operations through which a new block is generated for the distributed ledger.

At step 705, a device A associated with a user account A receives user input(s) conveying an intended transaction of an identified quantity of a virtual asset from a transferor (e.g., a transferor user account or other entity) to a transferee (e.g., a transferee user account or other entity). In most cases, user account A must be the transferor account for the intended transaction to proceed, but in some cases it may alternately be the transferee account. In some cases, user account A may even be a third party account other than the transferor and transferee, such as an account corresponding to a platform, a bank, an intermediary, or an adjudicative entity for transactions, or other third party account having heightened power over transactions.

At step 710, Device A associated with user account A encrypts at least part of the intended transaction using a private key associated with user account A to digitally sign the intended transaction.

At step 715, Device A broadcasts or otherwise transmits the encrypted intended transaction to each device (node) of a distributed peer-to-peer network of devices (nodes), optionally along with a public key corresponding to the private key used to digitally sign the transaction in step 710. Nodes receiving the public key may verify it against a key stored via a CA, or may verify a hash of the public key against a hash of a public key stored via the CA. Alternately, nodes may simply acquire the public key from the CA. The nodes may thereby verify that the intended transaction broadcast at step 715 was indeed digitally signed at step 710 by the user account A with the private key corresponding to user account A.

At step 720, a "Miner" Device B, a node in the distributed peer-to-peer network, validates the intended transaction in one or more of three ways.

The "Miner" Device B may decrypt the intended transaction using the public key to verify that it was indeed digitally signed at step 710 by the user account A with the private key corresponding to user account A, and may optionally verify that user account A is a the transferor account, transferee account, or another account authorized to request the transaction in question.

The "Miner" Device B may identify, based on existing records in the distributed ledger 130, that the transferor account possesses at least the identified quantity of the asset to be transferred.

The "Miner" Device B may identify that the transferor acct is not trying to perform a simultaneous conflicting transfer, such as one that would leave the transferor account lacking the identified quantity of the virtual asset to be transferred. That is, the "Miner" Device B may check that if all intended transactions involving the transferor account were to complete, the transferor account would be left with a non-negative (greater than or equal to zero) quantity of the virtual asset.

At step 725, once the intended transaction (and optionally other transactions in same time predetermined period) is validated as in step 720, the "Miner" Device B generates a block recording the verified transaction (and optionally other verified transactions in same predetermined time period), and broadcasts the block to the distributed peer-to-peer network of devices (nodes), thereby allowing each device (node) to update its copy of the blockchain ledger by appending the new block.

At optional step 730, the "Miner" Device B is rewarded for successfully generating the new block, for example by granting an account corresponding to "Miner" Device B with a virtual asset such as a cryptocurrency. This is detailed further in FIG. 7B.

At step 735, each device (node) of the distributed peer-to-peer network updates its copy of the blockchain ledger upon receipt of the new block from "Miner" Device B by appending the new block. The transaction is now complete.

Consensus among the nodes of the distributed network regarding new blocks can be achieved using a practical byzantine fault tolerance (PBFT) algorithm, a proof-of-work (PoW) algorithm, a proof-of-stake (PoS) algorithm, a delegated proof-of-stake (DPoS) algorithm, a proof-of-activity (PoA) algorithm, a proof-of-burn (PoB) algorithm, a proof-of-capacity (PoC) algorithm, a proof-of-storage (PoSt) algorithm, a proof-of-space (PoSp) algorithm, a proof-of-elapsed-time (PoET) algorithm, or a combination thereof.

While the discussions of FIG. 3, FIG. 7A, and FIG. 7B discuss transfer of virtual assets, it should be understood that these virtual assets may represent physical assets, so that ownership of a virtual asset implies ownership of the corresponding physical asset. For example, in FIG. 4A, ownership of the virtual asset VEHICLE_A implies ownership of a corresponding vehicle referred to as "Vehicle A."

FIG. 7B is a flow diagram illustrating operations through which generation of a new blocks for the distributed ledger is optionally incentivized.

Optional steps 745 and 750 and equation 755 of FIG. 7B expand on step 730 of FIG. 7A. At optional step 730 of FIG. 7A, the "Miner" Device B was rewarded for successfully generating the new block, for example by granting an account corresponding to "Miner" Device B with a virtual asset such as a cryptocurrency. The cryptocurrency may have real value and be exchangeable for real fiat currency, may be used as a virtual currency exclusively usable in a particular software application or at a particular online retailer or physical retailer, or some combination thereof. The generation and transfer of cryptocurrency to reward "Miner" Device B may be identified as a transaction in the next block that will be generated after the block generated by "Miner" Device B at step 725. Similarly, the block generated by "Miner" Device B at step 725 may identify a previous "Miner" Device that generated a previous block in the blockchain and may generate and transfer a similar reward to that "Miner" Device.

Step 745 explains that generating a new block to add to the blockchain can be made to be intentionally difficult if "miner" devices/nodes are to be rewarded as in step 730. A predetermined numeric (decimal or hexadecimal) difficulty target value may be used. To successfully generate a new block, a hash of the block (or block header) should be numerically less than the difficulty target value for the new block to be successful. Each "miner" device/node can try hashing the new block with various different nonce values in the metadata 325/355/385 of the block header in an attempt to find a nonce value that makes the hash of the whole block (or block header) be numerically less than the difficulty target value.

Step 750 explains that the difficulty target value can stay constant during a predetermined time period, such as 2 weeks. Just before the predetermined time period ends and before the next time period starts, difficulty target value is potentially adjusted up or down slightly, using the formula identified in block 755 or a similar formula. In some cases, a predetermined upper and lower bound may be set on how much the difficulty target value may be adjusted by.

The formula identified in block 755 identifies that (new adjusted difficulty target value)=(previous difficulty target value)×((predetermined time period)/(total transaction time for N transactions during predetermined time period)). N is defined as ((predetermined time period)/(desired block generation time)).

If the time period is 2 weeks (20160 minutes) and each block should take approximately 10 minutes to generate, N is ((20160 minutes)/(10 minutes))=2016. Thus, one might calculate the new adjusted difficulty target value as (new adjusted difficulty target value)=(previous difficulty target value)×((20160 minutes)/(total transaction time for 2016 transactions during predetermined time period)).

Figure 8:
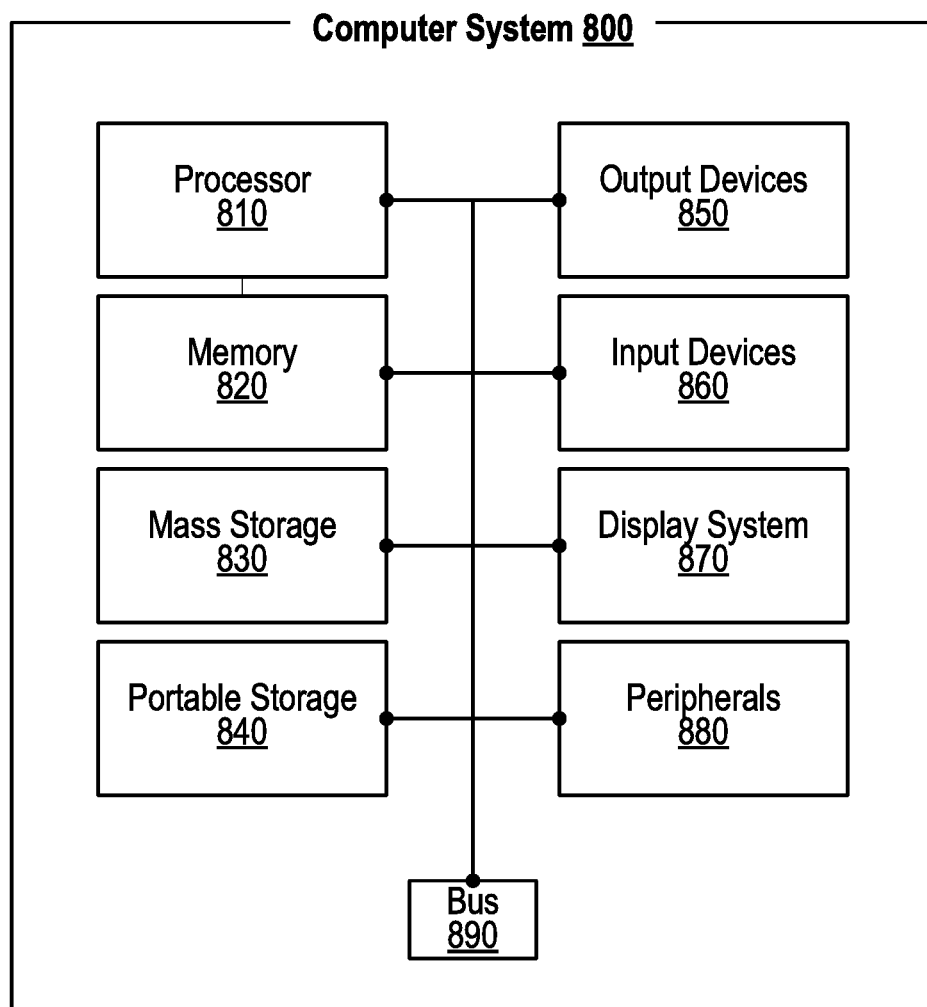
FIG. 8 is a block diagram of an exemplary computing device that may be used to implement some aspects of the subject technology.

FIG. 8 illustrates an exemplary computing system 800 that may be used to implement some aspects of the subject technology. For example, any of the computing devices, computing systems, network devices, network systems, servers, and/or arrangements of circuitry described herein may include at least one computing system 800, or may include at least one component of the computer system 800 identified in FIG. 8. The computing system 800 of FIG. 8 includes one or more processors 810 and memory 820. Each of the processor(s) 810 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 810 may include one or more cores, either integrated onto a single chip or spread across multiple chips connected or coupled together. Memory 820 stores, in part, instructions and data for execution by processor 810. Memory 820 can store the executable code when in operation. The system 800 of FIG. 8 further includes a mass storage device 830, portable storage medium drive(s) 840, output devices 850, user input devices 860, a graphics display 870, and peripheral devices 880.

The components shown in FIG. 8 are depicted as being connected via a single bus 890. However, the components may be connected through one or more data transport means. For example, processor unit 810 and memory 820 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive or an optical disk drive, is a non-volatile storage device for storing data and instructions for use by processor unit 810. Mass storage device 830 can store the system software for implementing some aspects of the subject technology for purposes of loading that software into memory 820.

Portable storage device 840 operates in conjunction with a portable non-volatile storage medium, such as a floppy disk, compact disk or Digital video disc, to input and output data and code to and from the computer system 800 of FIG. 8. The system software for implementing aspects of the subject technology may be stored on such a portable medium and input to the computer system 800 via the portable storage device 840.

The memory 820, mass storage device 830, or portable storage 840 may in some cases store sensitive information, such as transaction information, health information, or cryptographic keys, and may in some cases encrypt or decrypt such information with the aid of the processor 810. The memory 820, mass storage device 830, or portable storage 840 may in some cases store, at least in part, instructions, executable code, or other data for execution or processing by the processor 810.

Output devices 850 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 870. The printer may be inkjet, laserjet, thermal, or some combination thereof. In some cases, the output device circuitry 850 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Output devices 850 may include any ports, plugs, antennae, wired or wireless transmitters, wired or wireless transceivers, or any other components necessary for or usable to implement the communication types listed above, such as cellular Subscriber Identity Module (SIM) cards.

Input devices 860 may include circuitry providing a portion of a user interface. Input devices 860 may include an alpha-numeric keypad, such as a keyboard, for inputting alpha-numeric and other information, or a pointing device, such as a mouse, a trackball, stylus, or cursor direction keys. Input devices 860 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a wired local area network (LAN) port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, 802.11 Wi-Fi wireless signal transfer, wireless local area network (WAN) signal transfer, cellular data network wireless signal transfer, personal area network (PAN) signal transfer, wide area network (WAN) signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Input devices 860 may include any ports, plugs, antennae, wired or wireless receivers, wired or wireless transceivers, or any other components necessary for or usable to implement the communication types listed above, such as cellular SIM cards.

Input devices 860 may include receivers or transceivers used for positioning of the computing system 800 as well. These may include any of the wired or wireless signal receivers or transceivers. For example, a location of the computing system 800 can be determined based on signal strength of signals as received at the computing system 800 from three cellular network towers, a process known as cellular triangulation. Fewer than three cellular network towers can also be used—even one can be used—though the location determined from such data will be less precise (e.g., somewhere within a particular circle for one tower, somewhere along a line or within a relatively small area for two towers) than via triangulation. More than three cellular network towers can also be used, further enhancing the location's accuracy. Similar positioning operations can be performed using proximity beacons, which might use short-range wireless signals such as BLUETOOTH® wireless signals, BLUETOOTH® low energy (BLE) wireless signals, IBEACON® wireless signals, personal area network (PAN) signals, microwave signals, radio wave signals, or other signals discussed above. Similar positioning operations can be performed using wired local area networks (LAN) or wireless local area networks (WLAN) where locations are known of one or more network devices in communication with the computing system 800 such as a router, modem, switch, hub, bridge, gateway, or repeater. These may also include Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. Input devices 860 may include receivers or transceivers corresponding to one or more of these GNSS systems.

Display system 870 may include a liquid crystal display (LCD), a plasma display, an organic light-emitting diode (OLED) display, an electronic ink or "e-paper" display, a projector-based display, a holographic display, or another suitable display device. Display system 870 receives textual and graphical information, and processes the information for output to the display device. The display system 870 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 880 may include any type of computer support device to add additional functionality to the computer system. For example, peripheral device(s) 880 may include one or more additional output devices of any of the types discussed with respect to output device 850, one or more additional input devices of any of the types discussed with respect to input device 860, one or more additional display systems of any of the types discussed with respect to display system 870, one or more memories or mass storage devices or portable storage devices of any of the types discussed with respect to memory 820 or mass storage 830 or portable storage 840, a modem, a router, an antenna, a wired or wireless transceiver, a printer, a bar code scanner, a quick-response ("QR") code scanner, a magnetic stripe card reader, a integrated circuit chip (ICC) card reader such as a smartcard reader or a EUROPAY®-MASTERCARD®-VISA® (EMV) chip card reader, a near field communication (NFC) reader, a document/image scanner, a visible light camera, a thermal/infrared camera, an ultraviolet-sensitive camera, a night vision camera, a light sensor, a phototransistor, a photoresistor, a thermometer, a thermistor, a battery, a power source, a proximity sensor, a laser rangefinder, a sonar transceiver, a radar transceiver, a lidar transceiver, a network device, a motor, an actuator, a pump, a conveyer belt, a robotic arm, a rotor, a drill, a chemical assay device, or some combination thereof.

The components contained in the computer system 800 of FIG. 8 can include those typically found in computer systems that may be suitable for use with some aspects of the subject technology and represent a broad category of such computer components that are well known in the art. That said, the computer system 800 of FIG. 8 can be customized and specialized for the purposes discussed herein and to carry out the various operations discussed herein, with specialized hardware components, specialized arrangements of hardware components, and/or specialized software. Thus, the computer system 800 of FIG. 8 can be a personal computer, a hand held computing device, a telephone ("smartphone" or otherwise), a mobile computing device, a workstation, a server (on a server rack or otherwise), a minicomputer, a mainframe computer, a tablet computing device, a wearable device (such as a watch, a ring, a pair of glasses, or another type of jewelry or clothing or accessory), a video game console (portable or otherwise), an e-book reader, a media player device (portable or otherwise), a vehicle-based computer, another type of computing device, or some combination thereof. The computer system 800 may in some cases be a virtual computer system executed by another computer system. The computer can also include different bus configurations, networked platforms, multi-processor platforms, etc. Various operating systems can be used including Unix®, Linux®, FreeBSD®, FreeNAS®, pfSense®, Windows®, Apple® Macintosh OS® ("MacOS®"), Palm OS®, Google® Android®, Google® Chrome OS®, Chromium® OS®, OPENSTEP®, XNU®, Darwin®, Apple® iOS®, Apple® tvOS®, Apple® watchOS®, Apple® audioOS®, Amazon® Fire OS®, Amazon® Kindle OS®, variants of any of these, other suitable operating systems, or combinations thereof. The computer system 800 may also use a Basic Input/Output System (BIOS) or Unified Extensible Firmware Interface (UEFI) as a layer upon which the operating system(s) are run.

In some cases, the computer system 800 may be part of a multi-computer system that uses multiple computer systems 800, each for one or more specific tasks or purposes. For example, the multi-computer system may include multiple computer systems 800 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 800 from different networks communicatively coupled together via the internet (also known as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 820, the mass storage 830, the portable storage 840, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L8), resistive random-access memory (RRAM/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 810 for execution. A bus 890 carries the data to system RAM or another memory 820, from which a processor 810 retrieves and executes the instructions. The instructions received by system RAM or another memory 820 can optionally be stored on a fixed disk (mass storage device 830/portable storage 840) either before or after execution by processor 810. Various forms of storage may likewise be implemented as well as the necessary network interfaces and network topologies to implement the same.

FIG. 9 is a flow diagram illustrating operations for proximity-based itinerary tracking via distributed ledger. In particular, the operations illustrated in FIG. 9 may be performed by any user device 120 or any computing device 800 in a distributed architecture 125, such as one that performs tasks discussed as being performed by "Miner" Device B in FIG. 7A.

Step 905 includes storing a blockchain ledger comprising a plurality of blocks, wherein each of a plurality of computing devices also stores a copy of the blockchain ledger. This blockchain ledger may alternately be a different type of distributed ledger, such as a DAG ledger as illustrated in FIG. 6.

Step 910 includes receiving, from a first computing device, an indication of proximity (e.g., NFC communications 115) between the first computing device (e.g., user device 120) and the object (e.g., product 105 with NFC tag 110) of a plurality of objects of a first object type, wherein the indication of proximity between the first computing device and the first object also identifies the first object type. The object type may be a class of products, goods, or services, for example, and may also include characteristics of the object/product/good/service, such as but not limited to: unfinished, finished, stage of manufacture, stage of distribution, stage along a supply chain, location, shipping status, delivery status, unsold status, sold status, current or previous ownership, related products, sales of related products, sales of the object itself. Step 910 may also optionally involve receipt of one or more intended transactions as in step 705 of FIG. 7A. The indication of proximity, the intended transactions, or both may be encrypted using a private key associated with the first computing device and/or with a user of the first computing device as in step 710 of FIG. 7A. These may be decrypted with a corresponding public key in step 915 as part of the verification processes, as also discussed with respect to step 720 of FIG. 7A, as well as with respect to FIGS. 1A-1G.

Optional step 915 includes verifying the indication of proximity verifying that a code included as part of the indication of proximity matches a code in a database, wherein appending the new block to the plurality of blocks of the blockchain ledger occurs automatically in response to verifying the indication of proximity. This verification step 915 can alternately or also include any of the verification processes discussed with respect to step 720 of FIG. 7A, any of the verification processes discussed with respect to FIGS. 1A-1G, any other verification processes discussed herein, or combinations thereof.

Step 920 includes generating a hash of a most recent block of the blockchain ledger. Step 925 includes generating a new block header for a new block, wherein the new block header comprises at least the hash of the most recent block of the blockchain ledger. Step 930 includes generating the new block, wherein the new block comprises at least the new block header and one or more transactions corresponding to one or more changes in an inventory of the plurality of objects of the first object type. Such changes to inventory may include, for example, reductions of inventory of a particular type of object at a particular location/area/entity, additions to inventory of the particular type of object at a particular location/area/entity, transfers of inventory of the particular type of object from one location/area/entity to another, changes to a type or characteristic of one or more of a particular type of object (e.g., 3 of 10 vehicles have been repainted from red to blue, 1 of 9 computers has been modified with additional RAM, 2 of 7 plates have been damaged, or changes to any other characteristic discussed herein), or combinations thereof. Steps 920, 925, and 930 are discussed further with respect to FIG. 3 and may occur automatically in response to successful completion of the verification processes step 915.

Step 935 includes appending the new block to the plurality of blocks of the blockchain ledger. This may occur automatically in response to generation of the new block in step 930.

Step 940 includes transmitting the new block to the plurality of computing devices that each store the blockchain ledger in response to verifying the intended transaction, wherein each of the plurality of computing devices also appends the new block to their respective copy of the blockchain ledger, thereby recording the one or more transactions in the blockchain ledger. This may occur automatically in response to generation of the new block in step 930 and/or in response to appending the new block at step 940.

FIG. 10A illustrates a database for tracking transactions made by customers of an online retailer, also tracking addresses and related products ("upsell" products).

The database of FIG. 10A may be the manufacturer NFC tag network customers database of the Manufacturer NFC Tag Network 265 and/or the Ordering Website Network Customers Database of FIG. 2B. This figure displays the customer database which contains data which the customer inputs when purchasing an item from the Ordering Website Network and the data is sent to the Manufacturing Security Network. The database contains the customer information such as customer ID, name, address, and e-mail, the purchase data such as the account number and price of the purchased items and purchased upsell products such as upsell 1 SKU number, upsell 2 SKU number, Upsell N SKU number which are previously purchased upsell products by the customer.

FIG. 10B illustrates an expanded version of the database of FIG. 10A that tracks additional information such as security keys and resellers.

The database of FIG. 10A may be the Manufacturer NFC Tag Network NFC Manufacturer Database of the Manufacturer NFC Tag Network 265 of FIG. 2B, which supplies reseller data and the ordered product SKU number to the Upsell Security Network, as well as sends the NFC codes and public key to the customer and passes through the customer information private key and public keys to the Upsell Security Network. The database contains the private and public keys, the ordered product SKU number, the reseller URL, NFC code, customer information such as customer ID, name, address, e-mail, purchased upsell products such as Upsell 1 SKU number, Upsell 2 SKU number, Upsell N SKU number, the purchase data such as the account number and the price of the item(s) ordered.

Figure 11:
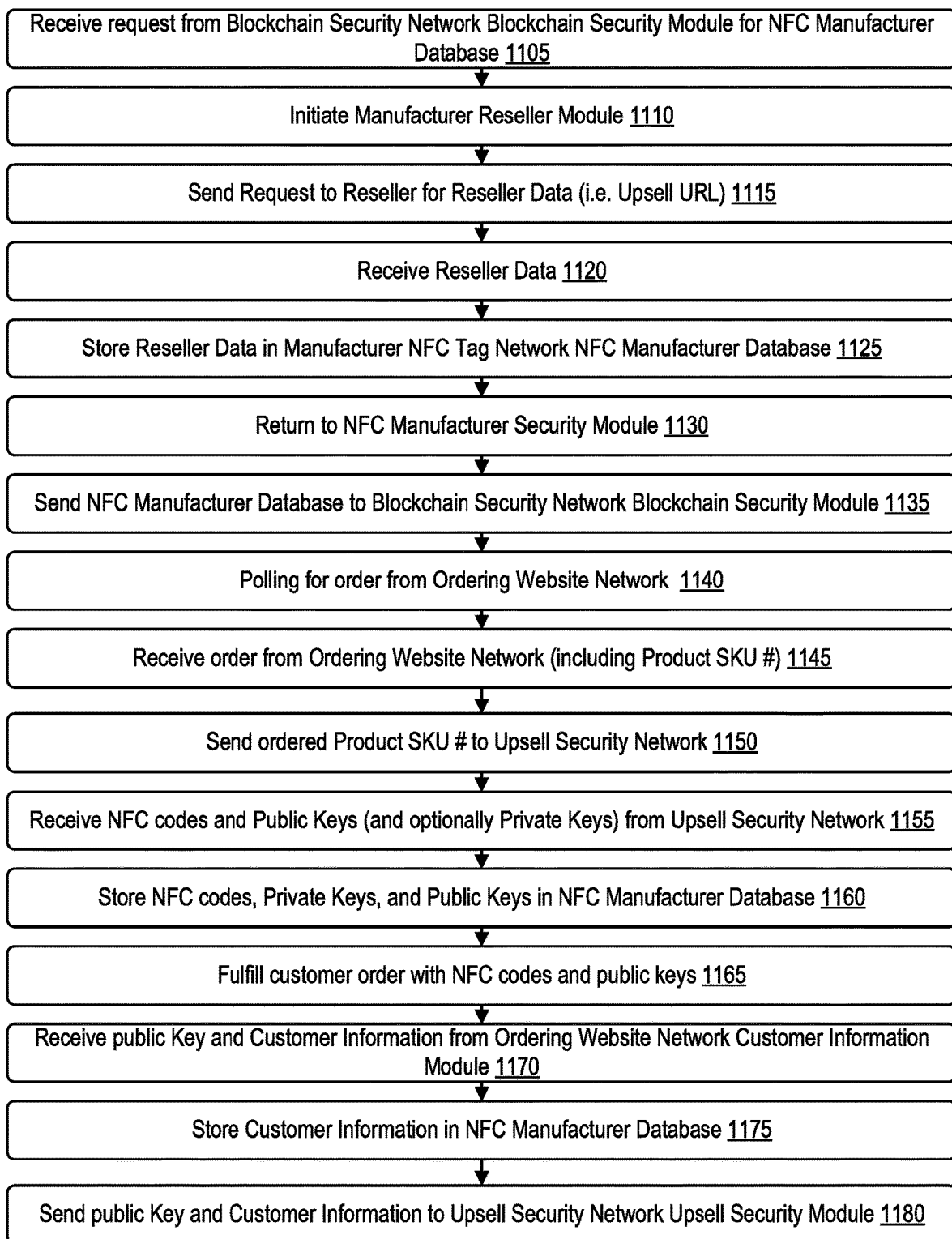
FIG. 11 is a flow diagram illustrating information flow relating to a customer purchasing a product via an online retailer.

FIG. 11 is a flow diagram illustrating information flow relating to a customer purchasing a product via an online retailer.

The processes of FIG. 11 correspond to the Manufacturer Security Module and the Manufacturer Reseller Module of FIG. 2B. In some cases, steps 1105, 1110, and steps 1135-1180 are performed by the Manufacturer Security Module while steps 1115-1125 are performed by the Manufacturer Reseller Module.

At step 1105, the process begins with the Manufacturing Security Module receiving a request from the Blockchain Security Network Blockchain Security Module for the NFC Manufacturer Database. At step 1110, the Manufacturer Reseller Module is initiated to receive the reseller data and store the data within the NFC Manufacturer Database.

At step 1115, the Manufacturer Security Module initiating the Manufacturer Reseller Module. At step 1120, the Manufacturer Reseller Module sends a request to the reseller for the reseller data which is a URL for relatable products that could be sold to the customer based on their current purchase. At step 1120, the reseller data is received by the Manufacturer Reseller Module, and is stored at step 1125 in the Manufacturer NFC Tag Network NFC Manufacturer Database. At step 1130, the Manufacturer Reseller Module then returns to the NFC Manufacturer Security Module.

At step 1135, the NFC Manufacturer Database is sent to the Blockchain Security Network Blockchain Security Module. At step 1140, the Manufacturer Security Module is then continuously polling for the order from the Ordering Website Network. At step 1145, the order is received from the Ordering Website Network including the product SKU number for the ordered numbers. At step 1150, the ordered product SKU number(s) is sent to the Upsell Security Network, and at step 1155, the Manufacturer Security Module receives the NFC codes, public keys (and optionally private keys) from the Upsell Security Network. At step 1160, the NFC codes, public keys and/or private keys are stored in the NFC Manufacturer Database and at step 1165, the customer order is fulfilled with the NFC codes and public keys attached to the product or packaging of the product. At step 1170, the public key and customer information is received from the Ordering Website Network Customer Information Module and is stored at step 1175 in the NFC Manufacturer Database. At step 1180, the public key and customer information is sent to the Upsell Security Network Ordering Website Protection Module.

FIG. 12 illustrates a database for tracking products that are related to a particular product ("upsell" products) at different locations as well as relevant coupons.

The database of FIG. 12 may be the Ordering Website Network Products for Sale Database provided by the Ordering Website Network (Online commerce platform 225 and/or Online retailer 230) of FIG. 2B. This database contains the products for sale (by their SKU numbers) and the related upsell products that a customer would potentially purchase based upon the product that they ordered. The database provides the product SKU number, an Upsell 1 SKU number, Upsell 2 SKU number and Upsell N SKU number indicating that there could be an infinite number of products that could related to the purchased product. The locations of the upsell products represented by Location 1, Location 2, and Location N. The database also contains coupons associated with the products represented by Coupon 1 and Coupon N.

FIG. 13 is a flow diagram illustrating operations for secure purchase orders from an online retailer.

The processes of FIG. 13 are performed by the Ordering Website Network Customer Information Module provided by the Ordering Website Network (Online commerce platform 225 and/or Online retailer 230) of FIG. 2B. At step 1305, process begins with the Customer Information Module sending a request to the Store Module for the Store Database, which contains the locations of the various products. At step 1310, Customer Information Module receives the Store Database from the Store Module and, at step 1315, stores the Store Database in the Products for Sale Database and the Products Upsell Database. At step 1320, the Ordering Website Network Customer Information Module then receives a request for the Ordering Website Network Products for Sale Database and Ordering Website Network Products Upsell Database from the Upsell Security Network Ordering Website Protection Module. At step 1325, corresponding data from Store Database in Products for Sale Database and Products Upsell Database is stored. At step 1330, the Ordering Website Network Products for Sale Database and Ordering Website Network Products Upsell Database are both sent to the Upsell Security Network Ordering Website Protection Module.

At step 1335, the Ordering Website Network Customer Information Module is then continuously polling for the Customer order. At step 1340, the Purchase data and ordered Product SKU number(s) are received, and at step 1345, the Customer Purchase Data is sent to the Blockchain Security Network Blockchain Security Module. At step 1350, the ordered product SKU number(s) are sent to the Manufacturer NFC Tag Network Manufacturer Security Module.

At step 1355, it is then determined if the Customer scans the NFC tag placed on the ordered product via the Manufacturer NFC Tag Network Manufacturer Security Module. If the customer does scan the NFC tag, then at step 1360, the Ordering Website Network Customer Information Module receives the public key and customer information from the customer, and then at step 1365, sends the public key and customer information to the Manufacturer NFC Tag Network Manufacturer Security Module. If the customer does not scan the NFC tag, then the process reverts to polling for the customer order at step 1335.

FIG. 14 illustrates an online retailer security and upsell database tracking purchases, related product groups ("upsell" products), security keys, customer information, coupon data, and other information.

The database of FIG. 14 may be the Blockchain Security Network Blockchain Database which securely stores all the data from the Ordering Website Network, Manufacturer NFC Tag Network and Upsell Security Network as in FIG. 2B. The database contains the private and public keys, the NFC code, product data such as the SKU number, upsell product SKU numbers, and purchase data such as account numbers and price. The reseller data such as the reseller URL, the location data of the products such as Location 1, Location 2, and Location N. Finally, the customer data such as the Customer's ID name, address, e-mail, previously purchased upsell products, and coupons associated with the products.

Figure 15:
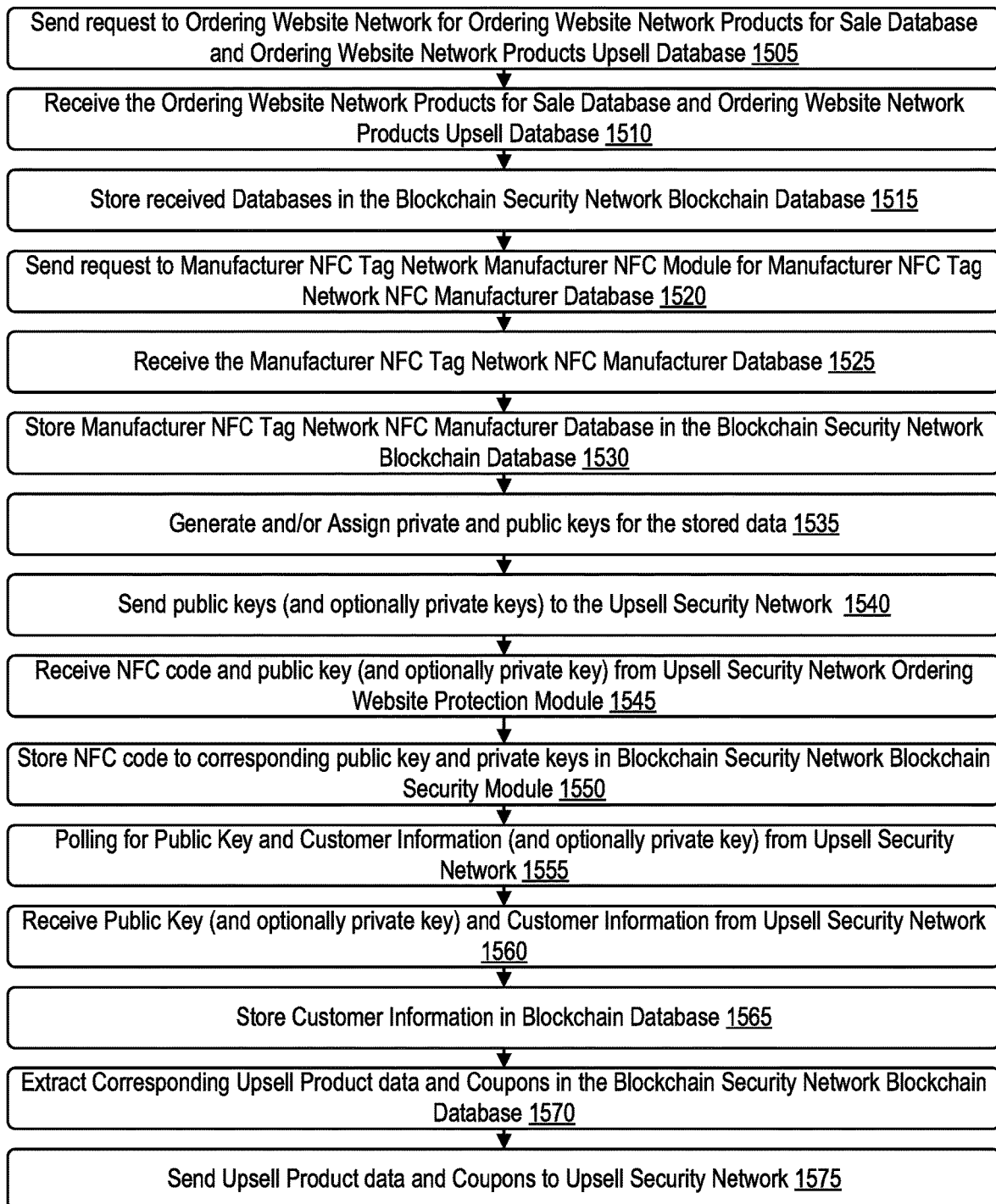
FIG. 15 is a flow diagram illustrating storage of information on a distributed ledger from various databases associated with an online retailer.

FIG. 15 is a flow diagram illustrating storage of information on a distributed ledger from various databases associated with an online retailer.

The process of FIG. 15 the Blockchain Security Network Blockchain Security Module. At step 1505, the Blockchain Security Module begins with sending a request to the Ordering Website Network for the Ordering Website Network Products for Sale Database and Ordering Website Network Products Upsell Database. At step 1510, the Ordering Website Network Products for Sale Database and Ordering Website Network Products Upsell Database (or data from one or both) are received. At step 1515, the Ordering Website Network Products for Sale Database and Ordering Website Network Products Upsell Database are stored in the Blockchain Security Network Blockchain Database. At step 1520, the Blockchain Security Module sends a request to the Manufacturer NFC Tag Network for the Manufacturer NFC Tag Network Manufacturer Database, and at step 1525, receives the Manufacturer NFC Tag Network Manufacturer Database. At step 1530, the Manufacturer NFC Tag Network NFC Manufacturer Database is stored in the Blockchain Security Network Blockchain Database.

At step 1535, the Private and public keys are assigned to each data entry to securely store the data. At step 1540, the public keys (and optionally the private keys) are sent to the Upsell Security Network. At step 1545, the Blockchain Security Module receives the NFC code, public and private key from the Upsell Security Network Ordering Website Protection Module.

At step 1550, the NFC code is stored to the corresponding public key and private keys in the Blockchain Security Network Blockchain Security Module. At step 1555, the Blockchain Security Network Blockchain Security Module is continuously polling for the private key, public key and customer information from the Upsell Security Network. At step 1560, the Blockchain Security Network Blockchain Security Module receives private key, public keys and customer information from the Upsell Security Network, and at step 1565, the customer information is stored in the Blockchain Security Network Blockchain Database. At step 1570, the corresponding Upsell Product data and coupons in the Blockchain Security Network Blockchain Database are extracted and at step 1575, are sent to the Upsell Security Network.

FIG. 16 illustrates an online retailer upsell database tracking customers, related product groups ("upsell" products), coupons, and security keys.

The database of FIG. 16 may be the Upsell Security Network Upsell Security Database of FIG. 2B, which contains data from the Blockchain Security Network and Manufacturer NFC Tag Network, as well as passes the private and public keys to and from the Blockchain Security Network to the Manufacturer NFC Tag Network. The database contains the private and public keys, the NFC code, the product data such as the ordered product SKU number and related Upsell products, as well as the customer information such as the customer's ID, name, address, e-mail, previously purchased upsell products and available coupons.

Figure 17:
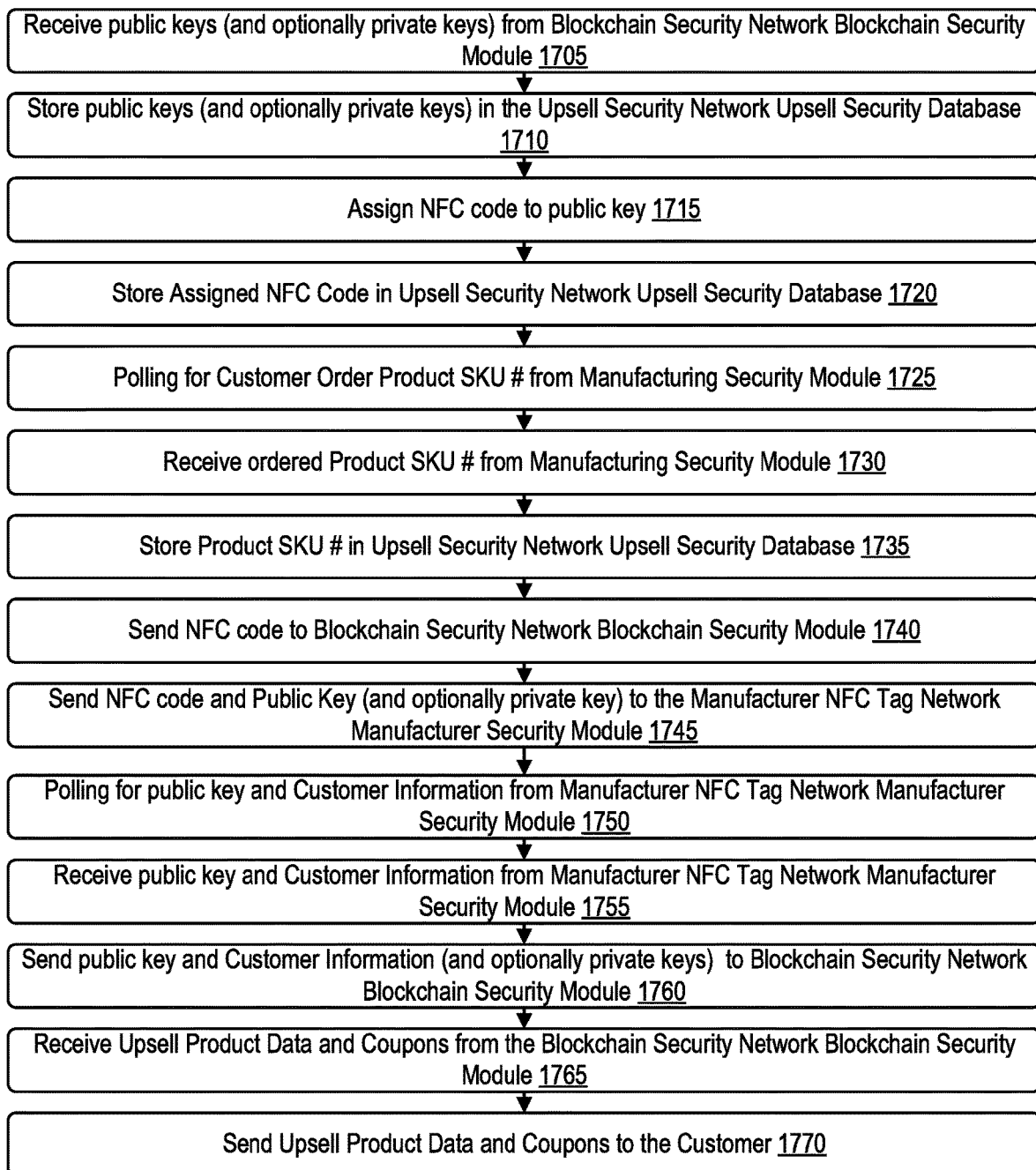
FIG. 17 is a flow diagram illustrating use of a distributed ledger to track purchases at an online retailer and provide the customer with recommendations and coupons.

FIG. 17 is a flow diagram illustrating use of a distributed ledger to track purchases at an online retailer and provide the customer with recommendations and coupons.

The processes of FIG. 17 are performed by the Ordering Website Protection Module of FIG. 2B. At step 1705, the process begins with receiving the private and public keys from Blockchain Security Network Blockchain Security Module. At step 1710, the private and public keys are stored in the Upsell Security Network Upsell Database, and at step 1715, the an NFC code is assigned to a public key (and optionally a private key, both of which may be generated at this step). At step 1720, the assigned NFC code is stored in the Upsell Security Network Upsell Security Database, and at step 1725, the Ordering Website Protection Module is continuously polling the customer order product SKU number from the Manufacturer NFC Tag Network Manufacturer Security Module.

Once the ordered product SKU number is received from the Manufacturer NFC Tag Network Manufacturer Security Module at step 1730, the data is then, at step 1735, stored in the Upsell Security Network Upsell Security Database. At step 1740, the NFC code is sent to the Blockchain Security Network Blockchain Security Module and at step 1745, the NFC code, private key, and public key(s) are sent to the Manufacturer NFC Tag Network Manufacturer Security Module.

At step 1750, the Ordering Website Protection Module is continuously polling for the public key and customer information from the Manufacturer NFC Tag Manufacturer Security Module. Once the Ordering Website Protection Module receives the public key(s) and customer information from the Manufacturer NFC Tag Manufacturer Security Module at step 1755, then the public key(s), customer information and private key are sent to the Blockchain Security Network Blockchain Security Module at step 1760. At step 1765, the Ordering Website Protection Module receives the upsell product data and associated coupons from the Blockchain Security Network Blockchain Security Module, and, at step 1770, sends the upsell product data and coupons to the customer.

Figure 18:
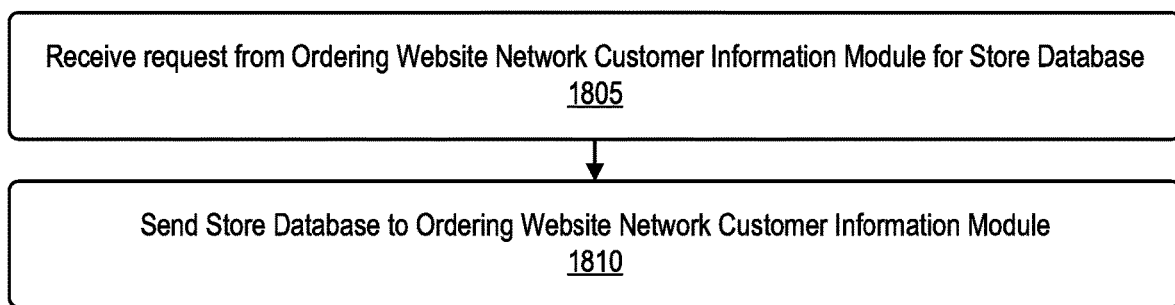
FIG. 18 is a flow diagram illustrating retrieval of information identifying store locations.

FIG. 18 is a flow diagram illustrating retrieval of information identifying store locations.

This is the store module of FIG. 2B. At step 1805, the process begins with the Store Module receiving a request from the Ordering Website Network Customer Information Module for the Store Database. At step 1810, the Store Module sends the Store Database to the Ordering Website Network Customer Information Module.

FIG. 19 illustrates a database of store locations at which particular products are stocked.

The database of FIG. 19 may be the manufacturer NFC tag network customers database of the Store Database of FIG. 2B, which contains the various locations for the products. The database contains the product SKU number and the various locations of the product represented by location 1, location 2 and location N.

While various flow diagrams provided and described above may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system 800 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method of tracking of an inventory via a distributed architecture that includes a plurality of computing devices, the method comprising:
    storing a distributed ledger comprising a plurality of blocks, wherein each of the plurality of computing devices also stores a copy of the distributed ledger;
    receiving, from a first computing device, an indication of proximity between the first computing device and a first object of a plurality of objects of a first object type, wherein the indication of proximity between the first computing device and the first object identifies the first object type;
    generating a hash of a most recent block of the plurality of blocks using a hash algorithm;
    generating a new block header for a new block, wherein the new block header comprises at least the hash of the most recent block;
    generating the new block comprising at least the new block header and one or more transactions corresponding to one or more changes in an inventory of the plurality of objects of the first object type that include a change in a characteristic of at least the first object;
    appending the new block to the plurality of blocks of the distributed ledger; and
    transmitting the new block to the plurality of computing devices that each store the distributed ledger, causing each of the plurality of computing devices to also append the new block to their respective copy of the distributed ledger, thereby recording the one or more transactions in the distributed ledger.

2. The method of claim 1, further comprising:
  identifying a code included within the indication of proximity, wherein the indication of proximity includes receipt of at least the code at the first computing device from an information medium corresponding to the first object; and
  verifying the indication of proximity by verifying that a code included as part of the indication of proximity matches a corresponding code in a verification database, wherein appending the new block to the plurality of blocks of the distributed ledger occurs automatically in response to verifying the indication of proximity.

3. The method of claim 2, wherein verifying that the code included as part of the indication of proximity matches the corresponding code in the verification database includes decrypting the code with a public key associated with the first computing device, wherein the code is encrypted via a private key associated with the first computing device.

4. The method of claim 1, wherein the indication of proximity between the first computing device and the first object is an indication that the first computing device has wirelessly received ledger identification data from short-range wireless communication circuitry corresponding to the first object via a short-range wireless communication protocol, the ledger identification data pointing to the distributed ledger and providing the first computing device with access at least a portion of the distributed ledger.

5. The method of claim 1, further comprising:
  receiving, from the first computing device, a signature encrypted via a private key associated with a first user corresponding to the first computing device;
  authenticating an identity of the first user by verifying that the signature can be decrypted with a public key associated with the first user;
  verifying that the first user has permission to access the distributed ledger based on the identity of the first user; and
  permitting the first computing device to access the distributed ledger.

6. The method of claim 1, wherein the change in the characteristic includes a change in ownership, and wherein the one or more changes in the inventory of the plurality of objects of the first object type include one or more changes in ownership of one or more of the plurality of objects of the first object type.

7. The method of claim 1, wherein each of a plurality of distributed ledgers stores a different type of information concerning the plurality of objects of the first object type, wherein the plurality of distributed ledgers includes the distributed ledger and one or more additional distributed ledgers other than the distributed ledger, wherein at least a first one of the plurality of distributed ledgers is a public distributed ledger, and wherein at least a second one of the plurality of distributed ledgers is a private distributed ledger.

8. The method of claim 1, wherein the distributed ledger is a private distributed ledger accessible by a customer and by a provider associated with the plurality of objects of the first object type, wherein the provider is one of a manufacturer, a distributor, a retailer, or a shipper.

9. The method of claim 1, wherein the change in the characteristic includes a change in location, and wherein the one or more changes in the inventory of the plurality of objects of the first object type include one or more changes in location of one or more of the plurality of objects of the first object type.

10. The method of claim 9, wherein the change in location includes a movement from a first location within an area to a second location within the area, wherein the area corresponds to at least one of a store or a warehouse.

11. The method of claim 1, wherein the change in the characteristic includes a change in status, and wherein the one or more changes in the inventory of the plurality of objects of the first object type include one or more changes in status of one or more of the plurality of objects of the first object type, wherein the one or more changes in status are associated with at least one of manufacturing, distribution, sales, or shipping.

12. The method of claim 1, wherein the change in the characteristic includes a change in retail procedure, and wherein the one or more changes in the inventory of the plurality of objects of the first object type include one or more changes in retail procedure associated with one or more of the plurality of objects of the first object type, wherein the one or more changes in retail procedure are associated with at least one of a change in pricing, a promotion, a discount, or a coupon.

13. The method of claim 1, wherein the change in the characteristic of at least the first object includes a modification to at least the first object, and wherein the one or more changes in the inventory of the plurality of objects of the first object type include one or more modifications to one or more of the plurality of objects of the first object type.

14. The method of claim 1, wherein the inventory of the plurality of objects of the first object type also identifies one or more secondary products of a second product type, wherein the second product type is complimentary to the first object type, and wherein the one or more secondary products include at least one of a service or a second object, wherein one or more changes in the inventory of the plurality of objects of the first object type are one or more changes concerning the one or more secondary products of the second product type.

15. The method of claim 1, wherein the new block also comprises one or more additional transactions corresponding to one or more changes in a secondary inventory of one or more secondary products of a second product type, wherein the second product type is complimentary to the first object type, and wherein the one or more secondary products include at least one of a service or a second object.

16. The method of claim 1, further comprising enabling a software application function on the first computing device from a disabled state in response to appending the new block to the plurality of blocks of the distributed ledger.

17. The method of claim 1, wherein the indication of proximity between the first computing device and the first object is an indication that the first computing device has wirelessly received ledger identification data from short-range wireless communication circuitry corresponding to the first object via a short-range wireless communication protocol, wherein the short-range wireless communication circuitry is included in at least one of the first object or packaging covering at least part of the first object.

18. The method of claim 1, wherein the first object includes an optical glyph, and wherein the indication of proximity between the first computing device and the first object is an indication that the first computing device scanned the optical glyph using a camera, wherein the optical glyph includes at least one of a bar code or a quick response (QR) code.

19. A system for tracking of an inventory via a distributed architecture that includes a plurality of computing devices, the system comprising:
  a non-transitory computer-readable storage medium that stores a distributed ledger including a plurality of blocks, wherein each of the plurality of computing devices also stores a copy of the distributed ledger;

a network communication transceiver that receives an indication of proximity between a first computing device and a first object of a plurality of objects of a first object type, and that transmits a new block to the plurality of computing devices, wherein the indication of proximity between the first computing device and the first object identifies the first object type; and one or more processors executing instructions that are stored in a memory, wherein execution of the instructions via the one or more processors causes the one or more processors to:

generate a hash of a most recent block of the distributed ledger using a hash algorithm, generate a new block header for the new block, wherein the new block header comprises at least the hash of the most recent block of the distributed ledger, generate the new block, wherein the new block comprises at least the new block header and one or more transactions corresponding to one or more changes in an inventory of the plurality of objects of the first object type that include a change in a characteristic of at least the first object, and append the new block to the plurality of blocks of the distributed ledger.

20. The system of claim 19, further comprising a short-range wireless signal transceiver corresponding to the first object, wherein the indication of proximity between the first computing device and the first object is an indication that the first computing device has wirelessly received data from the short-range wireless signal transceiver corresponding to the first object.

21. The system of claim 19, wherein the short-range wireless signal transceiver is a passive Near Field Communication (NFC) integrated circuit (IC) transceiver tag.

22. The system of claim 19, wherein packaging that at least partially encloses the first object includes the short-range wireless signal transceiver.

23. The system of claim 22, wherein receipt of the data by the first computing device from the short-range wireless signal transceiver corresponding to the first object unlocks the packaging.

24. The system of claim 19, further comprising an optical glyph corresponding to the first object, wherein the indication of proximity between the first computing device and the first object is an indication that the first computing device has scanned the optical glyph using a camera, wherein the optical glyph includes at least one of a bar code or a quick response (QR) code.

25. The system of claim 19, further comprising a database storing data identifying one or more sale transactions, wherein at least a portion of the one or more changes in the inventory of the plurality of objects of the first object type correspond to the one or more sale transactions, wherein the database identifies at least a location corresponding to each of the one or more sale transactions.

26. A method of tracking of an inventory via a distributed architecture that includes a plurality of computing devices, the method comprising:

storing a distributed ledger comprising a plurality of blocks, wherein each of the plurality of computing devices also stores a copy of the distributed ledger;

receiving, at a first computing device, an indication of proximity between the first computing device and a first object of a plurality of objects of a first object type;

transmitting a request to add a new block to the distributed ledger to at least one of the plurality of computing devices, the new block identifying one or more changes in an inventory of the plurality of objects of the first object type that include a change in a characteristic of at least the first object;

receiving the new block, the new block including a block header with a hash of a most recent block of the plurality of blocks, the hash based on a hash algorithm; and appending the new block to the plurality of blocks of the distributed ledger.

27. The method of claim 26, wherein the first object is capable of short-range wireless communication via a short-range wireless signal transceiver coupled to the first object, and wherein the indication of proximity between the first computing device and the first object is an indication that the first computing device has received data from the short-range wireless signal transceiver corresponding to the first object.

* * * * *